(12) United States Patent
Gednalske et al.

(10) Patent No.: US 9,974,296 B2
(45) Date of Patent: May 22, 2018

(54) AIRFOIL FOR FACILITATING FLUID DELIVERY

(71) Applicant: WINFIELD SOLUTIONS, LLC, Shoreview, MN (US)

(72) Inventors: Joe V. Gednalske, River Falls, WI (US); William Thomas Hambleton, Hudson, WI (US); Eric P. Spandl, Shoreview, MN (US); Lillian C. Magidow, St. Paul, MN (US); Gregory Dahl, Eagan, MN (US); Laura J. Hennemann, Elmwood, MN (US)

(73) Assignee: WINFIELD SOLUTIONS, LLC, Shoreview, MN (US)

( * ) Notice: Subject to any disclaimer, the term of this patent is extended or adjusted under 35 U.S.C. 154(b) by 0 days. days.

(21) Appl. No.: 15/285,180

(22) Filed: Oct. 4, 2016

(65) Prior Publication Data

US 2017/0020120 A1    Jan. 26, 2017

Related U.S. Application Data

(60) Division of application No. 14/808,626, filed on Jul. 24, 2015, now Pat. No. 9,491,938, which is a continuation of application No. 13/838,666, filed on Mar. 15, 2013, now Pat. No. 9,144,192.

(51) Int. Cl.
*B05B 3/02* (2006.01)
*A01M 7/00* (2006.01)
*A01C 23/04* (2006.01)

(52) U.S. Cl.
CPC ........... *A01M 7/006* (2013.01); *A01C 23/047* (2013.01); *A01M 7/005* (2013.01); *A01M 7/0064* (2013.01)

(58) Field of Classification Search
CPC .... A01M 7/006; A01M 7/005; A01M 7/0064; A01C 23/047; F01D 9/065; F01D 25/12; F01D 9/02
USPC ......................................... 239/161
See application file for complete search history.

(56) References Cited

U.S. PATENT DOCUMENTS

| | | | |
|---|---|---|---|
| 2,706,133 A | 4/1955 | North, Jr. et al. | |
| 2,874,656 A | 2/1959 | Bennett | |
| 3,178,078 A | 4/1965 | Wittke | |
| 3,762,650 A | 10/1973 | Radecki | |
| 4,260,130 A | 4/1981 | Brehm | |
| 5,062,572 A | 11/1991 | Reiter et al. | |
| 6,193,465 B1 * | 2/2001 | Liotta | B23P 15/04 29/889.722 |

(Continued)

FOREIGN PATENT DOCUMENTS

| | | |
|---|---|---|
| FR | 1303053 | 9/1962 |
| GB | 876315 | 8/1961 |
| WO | WO 2011/046424 | 4/2011 |

OTHER PUBLICATIONS

European Search Report dated Oct. 21, 2014, for EP Application No. 14160029.6.

*Primary Examiner* — Davis Hwu
(74) *Attorney, Agent, or Firm* — Dorsey & Whitney LLP

(57) ABSTRACT

The application is generally directed towards an airfoil for a fluid delivery tube. The airfoil includes a securing member operably connecting the airfoil to the tube, a fin extending downward and outward from the securing member and terminating in a tip, a shield extending inward and downward from the tip of the fin, and an air guide extending from a first end of the shield.

9 Claims, 28 Drawing Sheets

(56) References Cited

U.S. PATENT DOCUMENTS

| | | | | |
|---|---|---|---|---|
| 6,679,351 B2* | 1/2004 | Cummings | ............... | F01N 1/02 |
| | | | | 181/212 |
| 7,581,687 B2 | 9/2009 | Feith | | |
| 7,588,060 B2 | 9/2009 | Ballard | | |
| 7,921,654 B1* | 4/2011 | Liang | ...................... | F01D 5/186 |
| | | | | 415/115 |
| 2004/0022633 A1* | 2/2004 | Kraft | ......................... | F01D 5/18 |
| | | | | 416/191 |
| 2010/0310367 A1* | 12/2010 | Devore | ................... | F01D 5/189 |
| | | | | 416/1 |
| 2012/0228395 A1 | 9/2012 | Needham et al. | | |

* cited by examiner

AIRFOIL FOR FACILITATING FLUID DELIVERY

CROSS-REFERENCE TO RELATED APPLICATION(S)

This application is a divisional of U.S. patent application Ser. No. 14/808,626 filed Jul. 24, 2015, issued as U.S. Pat. No. 9,491,938 on Nov. 15, 2016, entitled "Valve Assembly for Fluid Delivery," which is a continuation of U.S. patent application Ser. No. 13/838,666 filed Mar. 15, 2013 entitled "Drop Nozzle," issued as U.S. Pat. No. 9,144,192 on Sep. 29, 2015, the contents of both are hereby incorporated by reference in their entireties.

FIELD

The present disclosure relates generally to agricultural sprayers, and more specifically to drop nozzles that may reduce spray drift for agricultural sprayers.

DESCRIPTION OF THE RELEVANT ART

Drop nozzles are typically used to spray plants and crops with an herbicide, fungicide, plate nutrients, or insecticide. Generally, individual nozzles may be mounted on a boom structure attached to an agricultural sprayer vehicle. The nozzles may be spaced apart on the boom such that each nozzle may spray a separate crop row.

Typically, drop nozzles are metal or plastic straight tubes that extend 6 to 24 inches and include a spray tip attached to the bottom. Drop nozzles conventionally are used to lower the release point of agricultural sprays, to direct application of pesticides and fertilizers between crop rows and to reduce the contact on top of a crop and direct sprays into the crop canopy. Typically, as a sprayer passes across a field, it creates a wake which disturbs the deposition of droplets within the spray pattern. Additionally, wind travelling across a field may also cause disturbance of the spray pattern and could lead to pesticide drift or reduced deposition.

In some prior designs, the tubes may break off from the boom when they encounter objects, such as plants, rocks, or hills. Generally, when the tubes break off, they may cause fluid they are distributing (such as pesticide) to be spilled or leaked. Additionally, the spray tips attached to the drop nozzle tubes may hit the ground and break off or become clogged with soil. Both the drop nozzle and spray tips may have to be frequently replaced as they may be easily damaged or broken off.

SUMMARY

Some embodiments of the present disclosure may take the form of a drop nozzle for an agricultural sprayer. The drop nozzle may include a valve assembly including a shutoff valve, a tube operably connected to the valve assembly, and an airfoil connected to the tube. The drop nozzle as described herein may help to reduce spray drift as liquid is applied to crop rows.

Other embodiments of the present disclosure may take the form of a device for applying liquids to crops, such as pesticides or fertilizers. The device includes an extension member defining a fluid pathway, a valve assembly connected to the extension member and in fluid communication with the fluid pathway, and an airfoil connected to the extension member. The airfoil is configured to direct airflow around one or more portions of the extension member.

Yet other embodiments of the present disclosure include an agricultural sprayer. The agricultural sprayer includes a boom or other support structure, a reservoir, and a drop nozzle connected to the boom and fluidly connected to the reservoir. The drop nozzle includes a tube defining a fluid pathway and an airfoil connected to the tube. During movement, the airfoil directs air flow around at least a portion of the drop nozzle.

In one embodiment, an air directing apparatus for a fluid delivery tube is disclosed. The air directing apparatus includes a projection, a platform, and a ramp. The platform is coupled to a bottom edge of the projection and includes a first end and a second end. The ramp is coupled to the second end of the platform and includes a convex curve as it extends from the second end of the platform, the curvature directing air towards an outlet of the fluid delivery tube.

In another embodiment, an airfoil for a fluid delivery tube is disclosed. The airfoil includes a securing member for operably connecting the airfoil to the fluid tube, a fin extending downward and outward from the securing member and terminating in a tip, a shield extending inward and downward from the tip of the fin, and an air guide extending from a first end of the shield.

In yet another embodiment, an airfoil for use with a drop nozzle is disclosed. The airfoil includes a bracket configured to be connected to the drop nozzle, a fin extending outward and angled downward from the bracket, and a shield connected to the fin and arranged substantially perpendicularly to the fin to define a surface intersecting with a bottom edge of the fin.

Other aspects, features and details of the present disclosure can be more completely understood by reference to the following detailed description of a preferred embodiment, taken in conjunction with the drawings and from the appended claims.

BRIEF DESCRIPTION OF THE DRAWINGS

FIG. 1 is a front perspective view of an agricultural sprayer including a drop nozzle.

FIG. 2A is a side perspective view of the drop nozzle of FIG. 1.

FIG. 2B is a front elevation view of the drop nozzle.

FIG. 2C is a front perspective view of the drop nozzle.

FIG. 3A is an enlarged view of the drop nozzle illustrating an airfoil.

FIG. 3B is an enlarged rear perspective view of the drop nozzle.

FIG. 3C is an enlarged side elevation view of the drop nozzle.

FIG. 4 is a cross-section view of the drop nozzle taken along line 4-4 in FIG. 3A.

FIG. 5A is a right side elevation view of a first half of the airfoil removed from the drop nozzle.

FIG. 5B is a left side elevation view of the first half of the airfoil removed from the drop nozzle.

FIG. 6 is an enlarged elevation view of the drop nozzle illustrating a valve assembly.

FIG. 7 is an enlarged side perspective view of the drop nozzle illustrating the valve assembly.

FIG. 8 is a cross-section view of the drop nozzle taken along line 8-8 in FIG. 6.

FIG. 9 is a cross-section view of the drop nozzle taken along line 9-9 in FIG. 7.

FIG. 10A is a front perspective view of a valve housing for the valve assembly.

FIG. 10B is a cross-section view of the valve housing taken along line 10B-10B in FIG. 10A.

OVERVIEW

Embodiments of the present disclosure may take the form of a spray drift reducing drop nozzle system for an agricultural sprayer. In some embodiments herein the drop nozzle may be used to reduce spray drift or reduce off-target movement of spray droplets from their intended target or field. The drop nozzle may include an enhanced aerodynamic shape, which may reduce drift due to wind forces. In some embodiments, the drop nozzle may include an airfoil connected to a bottom portion of a distribution tube. The airfoil may direct air flow around the drop nozzle, as well as act to provide cover for liquid as it flows from an outlet the nozzle to reduce the liquid from drifting away from the intended or desired spray area. For example, the airfoil may reduce spray shear that typically occurs due to forward travel of the sprayer. In particular, the airfoil or wing may create an air wake such that the fluid sheet (deposited by the sprayer tip at the end of the drop nozzle) breakup resulting in droplet formation may occur at a relatively quiescent environment in the absence of a cross-sheet shear force.

Additionally, the airfoil may help to control the point at which the spray pattern breaks up and disperses, as well as direct airflow downwards to direct the spray down towards the target area. In other words, the airfoil may help liquid distributed from the tube to reach its intended target without substantial drift.

The airfoil may be formed as a separate component attachable to the drop nozzle or formed integrally therewith. The airfoil may have a fin or wing shape where a length of the airfoil may have a larger dimension than the thickness or width. The width may be smaller than a width of a tube of the drop nozzle. The airfoil may extend from a first portion of the tube outwards and downwards at an angle. A shield or cover may form the bottom surface of the airfoil and the shield may extend from a first end or tip of the airfoil back towards the tube. The shield may have a ramp or air guide extending from an end of the shield. The air guide may be curved upwards away from the ground towards a top of the drop nozzle and may direct air to flow over the shield reducing wind shear.

The drop nozzle may also include a shutoff valve to prevent leakage or spillage. For example, if the drop nozzle encounters an object (such as a raised portion of land, rock, or portion of a crop) that causes the drop nozzle to break off of the boom, the shutoff valve may close, restricting or substantially preventing fluid flow if the drop nozzle is damaged or pulled off of a spray arm of the boom.

The drop nozzle may also include a breakaway hinge. The breakaway hinge may allow the drop nozzle to encounter one or more objects or obstacles and rather than break off of the boom, may rotate and spring back into position. In other words, the breakaway hinge may rotatably connect the drop nozzle to the boom, allowing the drop nozzle to rotate relative to the boom. Accordingly, as the drop nozzle is pulled by the sprayer vehicle, the drop nozzle may not break off of the boom when encountering an object, but may rotate upwards and then be pulled back into position. This may allow the nozzle at the end of the drop nozzle tube to be better protected and may resist the nozzle from breaking off the tube, as the entire tube may rotate in response to encountering an object.

The breakaway hinge and airfoil may allow the drop nozzle to be positioned closer to the target area than conventional nozzles. This allows for a closer release point for the fluid deposited by the nozzle, improving deposition and reducing drift risk.

DETAILED DESCRIPTION

Turning now to the figures, the drop nozzle will be discussed in further detail. FIG. 1 is a perspective view of an agricultural sprayer 100. The agricultural sprayer 100 may include a reservoir 102, a boom 104 or nozzle support arm, as well as a plurality of drop nozzles 106 extending from the boom 104. The agricultural sprayer 100 may be a vehicle, such as a tractor, that may pull boom 104 and nozzles 106 across one or more fields or crops. The reservoir 102 holds one or more liquids to be deposited by the drop nozzles 106 onto the crops. For example, the reservoir 102 may hold herbicide, pesticide, fertilizer, water, and/or insecticide. The liquid may vary based on the types of crops, time of year, or desired nutrients or defenses to be applied to the plants.

The boom 104 may be connected to the sprayer 100 and extend along a back end of the sprayer 100. The boom 104 may have a length determined by the number of crop rows or crop area to be sprayed at one time. Generally, the boom 104 may have a length sufficient to cover a plurality of crop rows. The boom 104 may include a plurality of fluid pathways (not shown) that may fluidly connect each of the drop nozzles 106 to the reservoir 102. The fluid pathways may be rigid (e.g., pipes) or may be flexible (e.g. hoses).

The plurality of drop nozzles 106 may extend from the boom 104 and are fluidly connected to the reservoir 102. The drop nozzles 106 may have a length sufficient to be positioned above the ground or crops at the desired spray distance. For example, in some instances, the drop nozzles 106 may be positioned 18 to 24 inches above the crop. However, the distance above the crop may be varied based on a number of factors, such as, type of crop, terrain of the fields, speed of the vehicle, and/or winds or other weather.

An illustrative drop nozzle 106 will now be discussed in more detail. FIGS. 2A-2C are various views of the drop nozzle 106. Referring to FIGS. 1 and 2A-2C, the drop nozzle 106 may be connected to the boom 104 such that the airfoil may be positioned between the vehicle and the sprayer or nozzle. In other words, the pointed end of the airfoil may form a front side of the drop nozzle. However, it should be appreciated, that in other embodiments, the drop nozzle may be differently oriented. The drop nozzle 106 may have a length based on the desired spray height, as well as the boom height. For example, typically, the drop nozzle may have a length between 6 inches to 24 inches. However, in other embodiments, the drop nozzle length may be less than 6 inches or greater than 24 inches.

Figure 2A:
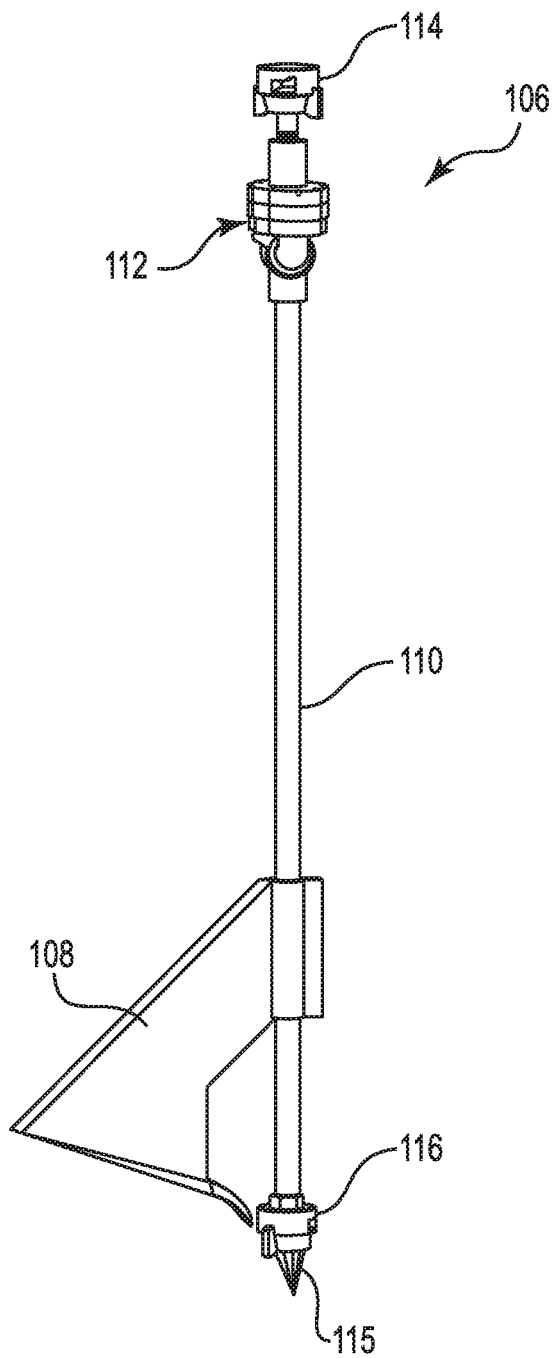
Figure 2B:
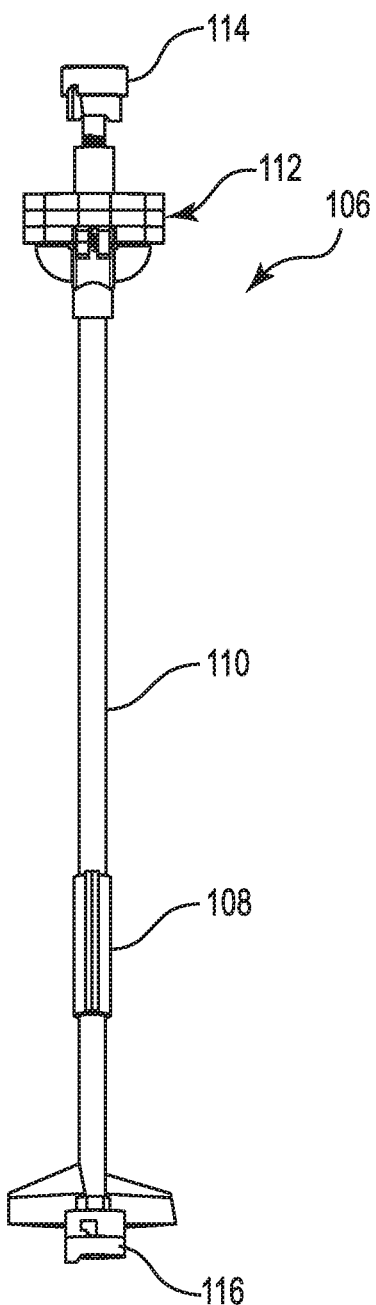
Figure 2C:
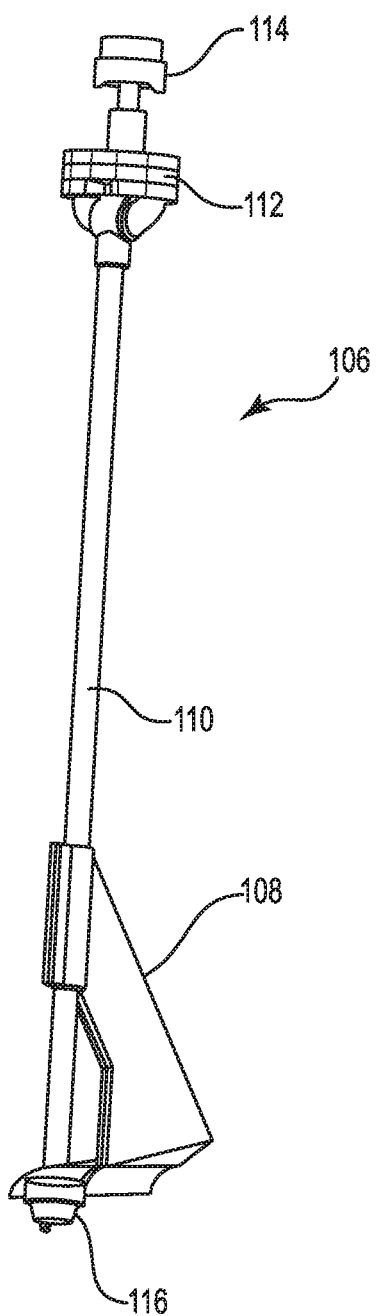

With reference to FIGS. 2A-2C, the drop nozzle may include an attachment collar 114, a valve assembly 112, a tube 110, an airfoil 108, and a sprayer collar 116. The attachment collar 114 connects the drop nozzle 106 to the boom 104, e.g., by attaching to one or more hoses, pipes, or the like, that are fluidly connected to the reservoir 102. The attachment collar 114 may be configured to be selectively removable, allowing the drop nozzle 106 to be removed from the boom 104. The attachment collar 114 configuration may be varied depending on the boom and the desired connection between the nozzle 106 and the boom 104.

The valve assembly 112 will be discussed in more detail below, but generally includes a breakaway hinge and shutoff valve to accommodate instances where the nozzle 106 encounters an object.

The tube 110 extends from the valve assembly 112 and defines a fluid channel 118 (see FIG. 4) therein. The tube 110 provides fluid as received from the reservoir 102 to one or more spray tips or nozzles connected to the sprayer collar 116. The tube 110 may be generally cylindrical and may be constructed out of a rigid and/or flexible material. In some embodiments, the tube 110 may be plastic, metal, one or more metal alloys, or other substantially rigid materials. In other embodiments, the tube 110 may be a generally flexible length of tubing, such as a hose. In these embodiments, the tube 110 may be a flexible material, such as rubber, plastic, or the like. Additionally, in instances where the tube may be flexible, the valve assembly 116 may extend downwards along a length of the tube to help support the tube and maintain its orientation.

Additionally, although the tube 110 is illustrated as being substantially straight, it should be noted that other configurations are envisioned.

The sprayer collar 116 provides an attachment mechanism for one or more nozzles or sprayers. For example, the drop nozzle 106 may include a spray tip 115 or nozzle that connects to sprayer collar 116 to further direct the liquid as it exits the drop nozzle 106. In some embodiments, the spray tip 115 may be configured to vary a flow rate and/or pressure from the drop nozzle to control the fluid deposition on the target area.

The sprayer tip 115 may also determine the initial flow pattern as the fluid exits the drop nozzle. However, in other embodiments. The spray tip 115 may have a length, outlet aperture size, and shape based on the crops that may be sprayed with the drop nozzle, the ground topography, and/or the liquid to be applied. Accordingly, the discussion of any particular spray tip 115 is meant the spray tip 115 may be omitted. In these embodiments, the terminal end of the tube 110 may form the outlet of the drop nozzle 106 and the sprayer collar 116 may be omitted. In yet other embodiments, the sprayer collar 116 may be contoured or otherwise shaped to act as a nozzle or sprayer for the drop nozzle 106.

The airfoil 108 reduces wind shear experienced by the drop nozzle 106 and shelters the spray as it exits the drop nozzle 106. FIGS. 3A-30 illustrate various views of the airfoil attached to the tube. FIG. 4 is an enlarged cross-section view of the drop nozzle taken along line 4-4 in FIG. 3A. With reference to FIGS. 3A-4, the airfoil 108 is attached to the tube 110 and extends outwards and downwards from its connection point. As briefly mentioned above, in some embodiments, when connected to the boom 104, the airfoil 108 may extend from the tube 110 towards the vehicle and thus may be positioned between the vehicle and the outlet of the tube. In other words, the drop nozzle 106 may be operably connected to the boom 104 so that the airfoil forms a front end of the drop nozzle 102 assembly. The position of the airfoil 108 relative to the spray tip 115 may be varied as desired and may depend on the type of spray tip 115 and/or length of the spray tip 115. In particular, the airfoil 108 may be moved upwards or downwards on the tube 110 to accommodate different spray tips 115. For example, a bottom of the airfoil 108 may be positioned ¼" to 2" above the spray tip 115. However, in other embodiments, the airfoil may be positioned further above or closer to the spray tip.

As generally discussed above, the airfoil may direct air flow to create a desired spray deposition. In some instances, the airfoil may exert a force on the air stream flowing around the drop nozzle, causing the air steam to be deflected downward, creating a flow region that is more co-directional with the spray sheet of liquid as it exits the sprayer tip 115 than the ambient air steam and may be more quiescent than the flow behind than a blunt object or component.

The airfoil 108 may be integrally formed with the tube 110 (e.g., through injection molding, machining, or the like), or may be a separate component attached thereto. In embodiments where the airfoil 108 may be separate from the tube 110, the airfoil 108 may be removable and interchangeable. For example, a number of different airfoils having different dimensions or shapes may be connected to the tube 110. This allows the drop nozzle to be used with a variety of different types of crops and group topography. The airfoil 108 may generally be positioned on a bottom half to the tube 110 and typically towards the bottom quarter of the tube 110. As an example, the airfoil 108 may be positioned closer towards the terminal end of the drop nozzle 106 than to the proximal end.

In one embodiment, the airfoil 108 may include two halves 120, 122 or shells that connect to each other and around the tube 110. FIGS. 5A and 5B are perspective views of one of the halves 120, 122. Each of the halves 120, 122 may be substantially similar and so the discussion of the first half 120 is meant to encompass the features of the second half 122, which may be a mirror image thereof. Each of the halves 120, 122 may include a bracket 138 including a curved wall 136. The curved wall 136 defines a tube recess 148 to receive a portion of the tube 110. The brackets 138 for each half 120, 122 of the airfoil 108 meet halfway around the tube 110 to surround at least a portion of the tube. A flange 142 extends from the curved wall 136 away from the tube 110.

With reference to FIGS. 3A-5B, a fin 126 extends downwards and outward from the curved wall 136 of the bracket 138. The fin 126 is angled away from the tube 110 and terminates at a tip 124. The fin 126 may have a front side 134 (see FIG. 3B) and a back side 132. The back side 132 may extend from a bottom portion of the curved wall 136 substantially parallel to the front side 134, but at an inflection point 146 may extend downwards substantially parallel with the tube 110.

A shield 128 may form a bottom surface of the airfoil 108. The shield 128 may have a larger width than the backside 132 of the fin 126. The shield 128 may extend outwards from its attachment to the bottom of the fin 126 and may angle outwards and slightly downwards from the tip 124. In this manner, the shield 128 may form a substantially triangular platform that is angled from the trip 124 downwards towards the sprayer collar 116. It should be noted that in these embodiments, the bottom surface of the fin 126 may also be angled, such that the tip 124 may be higher than a back end 144 of the fin 126. Typically the shield 128 may have a width at its largest portion that may be selected to approximately match the width of a spray sheet of fluid as it exits the sprayer tip 115 or may be larger than the spray sheet, e.g., 2 to 3 times as large as the desired or expected spray sheet width.

At the backend 144 of the fin 126, the shield 128 may transition to form an air guide 130 or ramp. The air guide 130 curves outward and downwards from the backend 144. In some embodiments, the air guide 130 may have an angle of curvature ranging between 0 to 30 degrees and in some instances the curvature of the air guide 130 may range between 0.1 to 1.2 times the length of the fin 126. The air guide 130 directs air downwards towards the outlet of the tube and the sprayer, as will be discussed in more detail below. upwards and over across the shield.

Figure 3A:
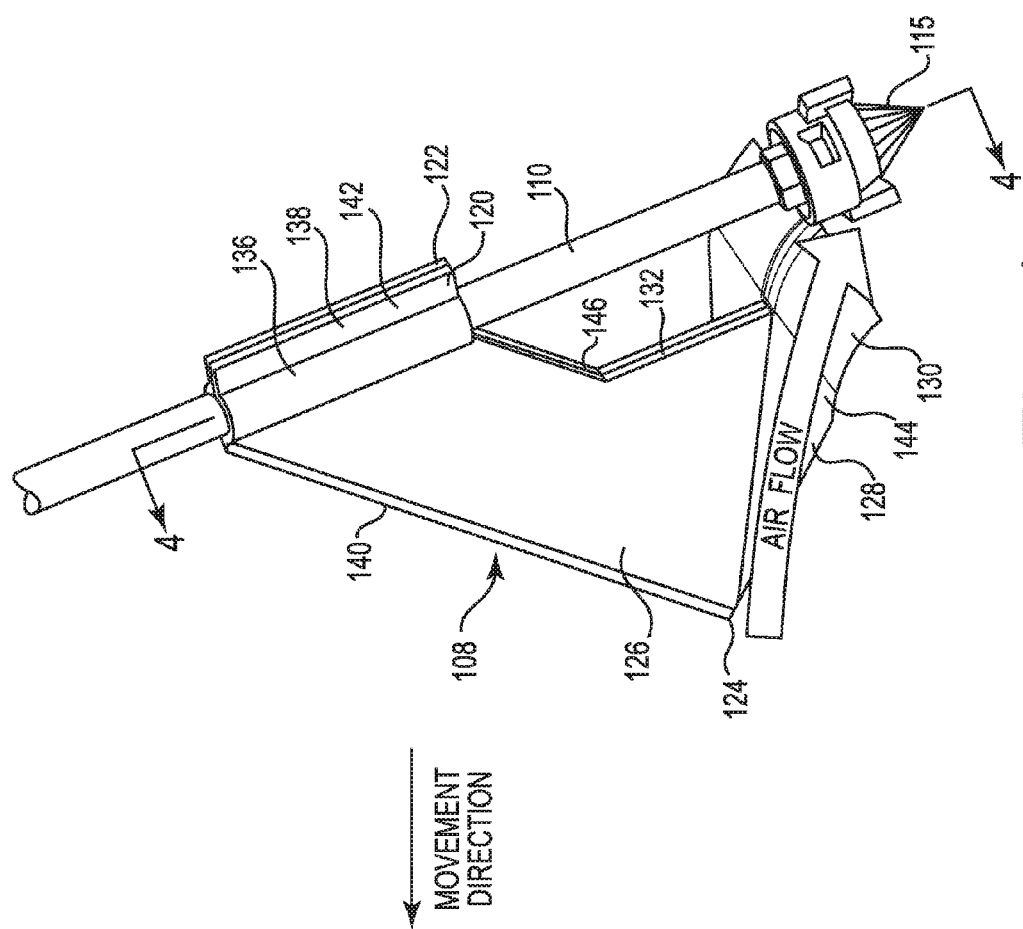
Figure 3B:
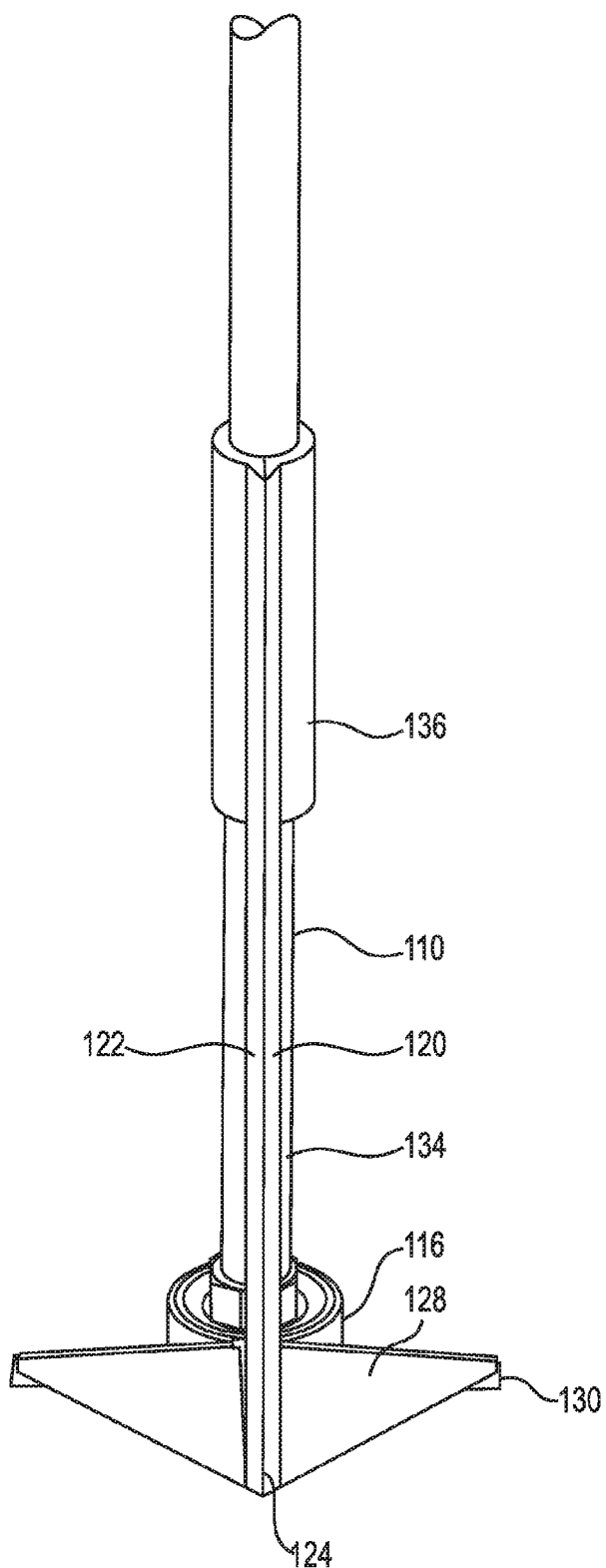
Figure 3C:
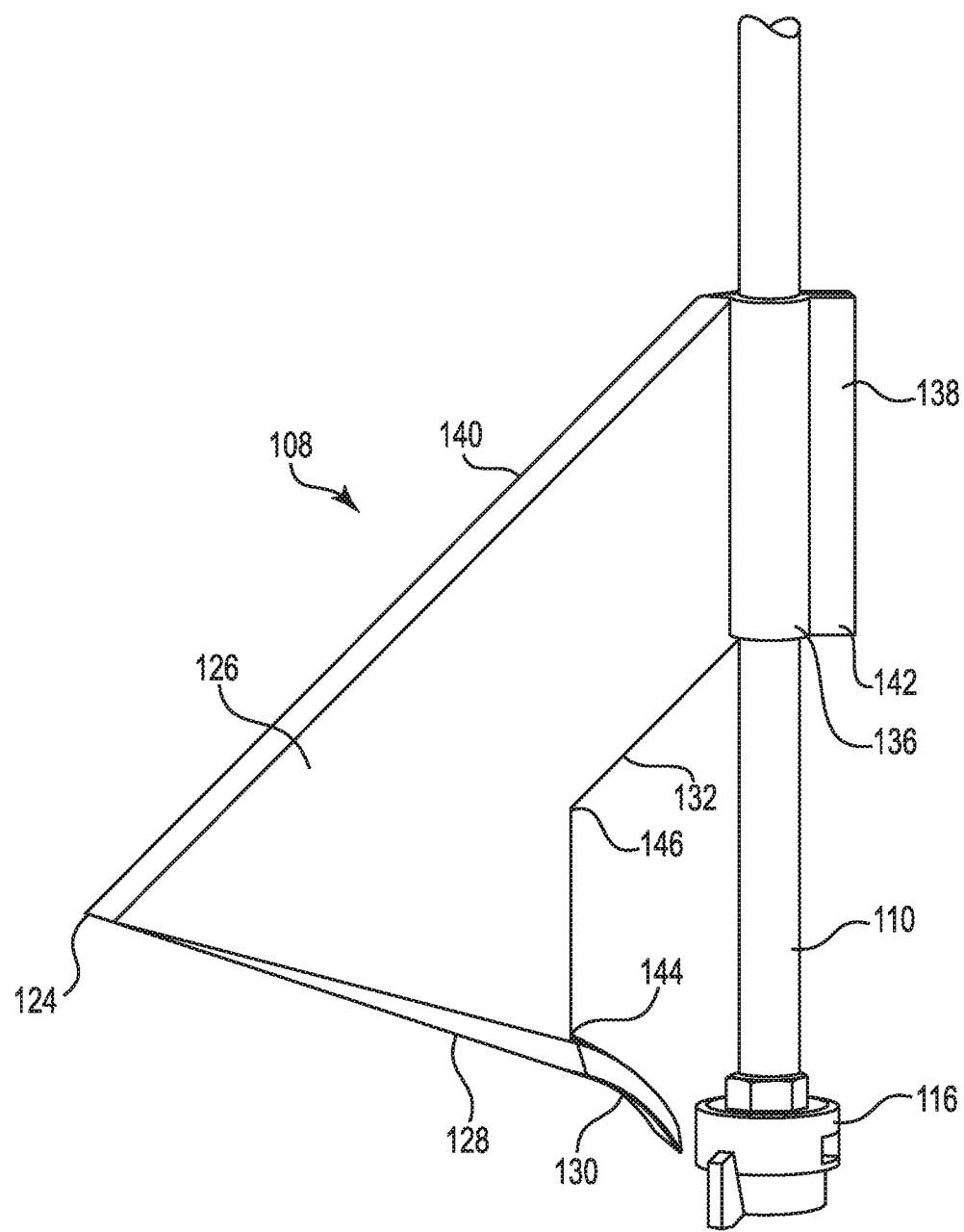
Figure 4:
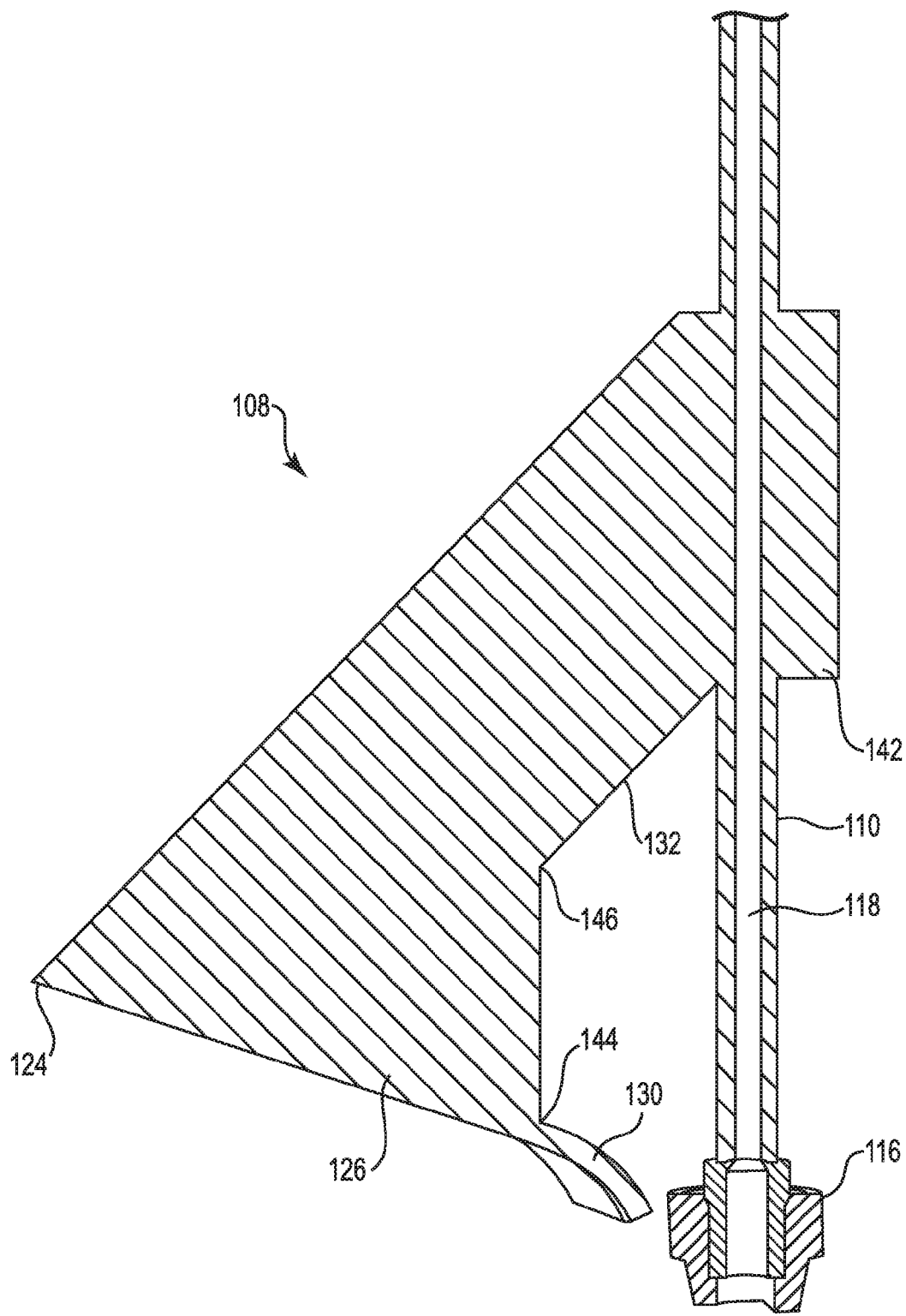
Figure 5A:
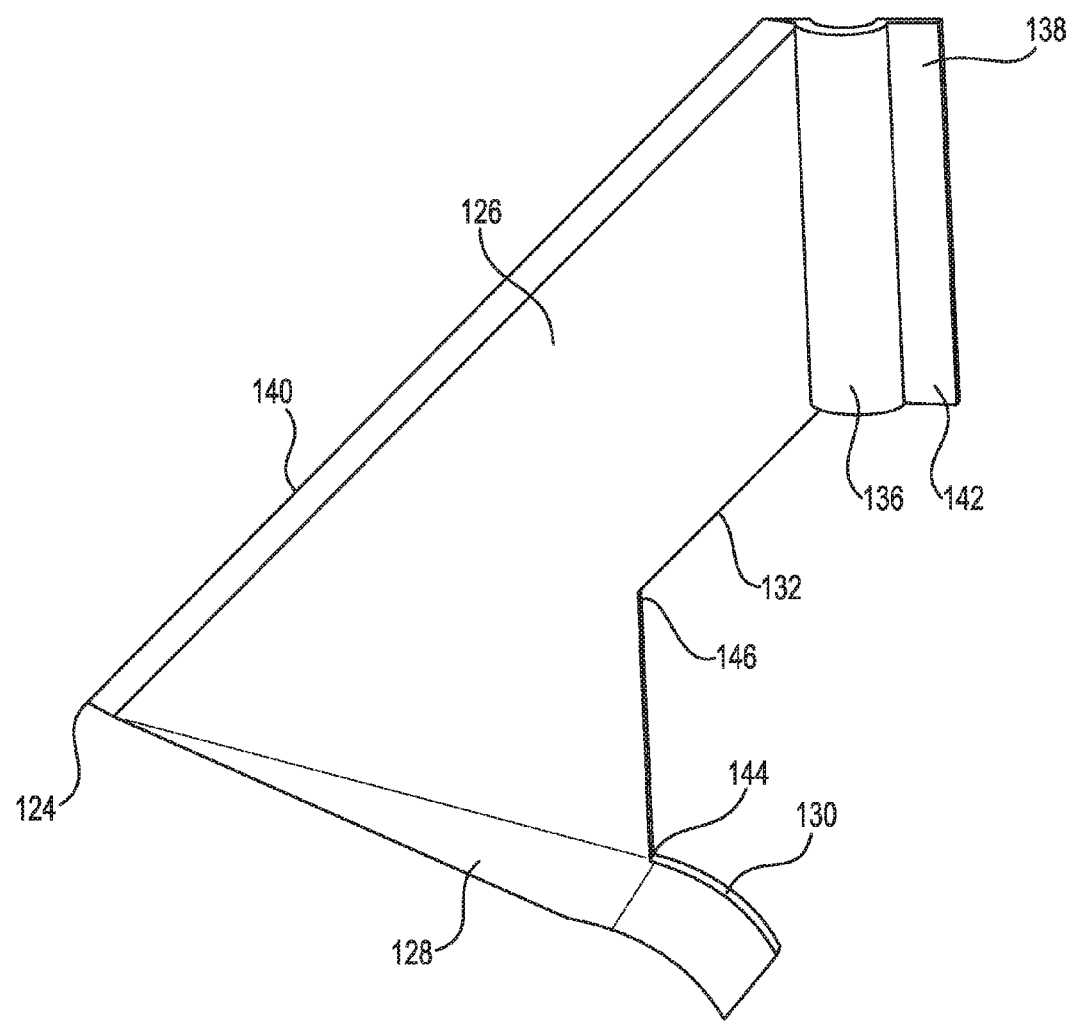
Figure 5B:
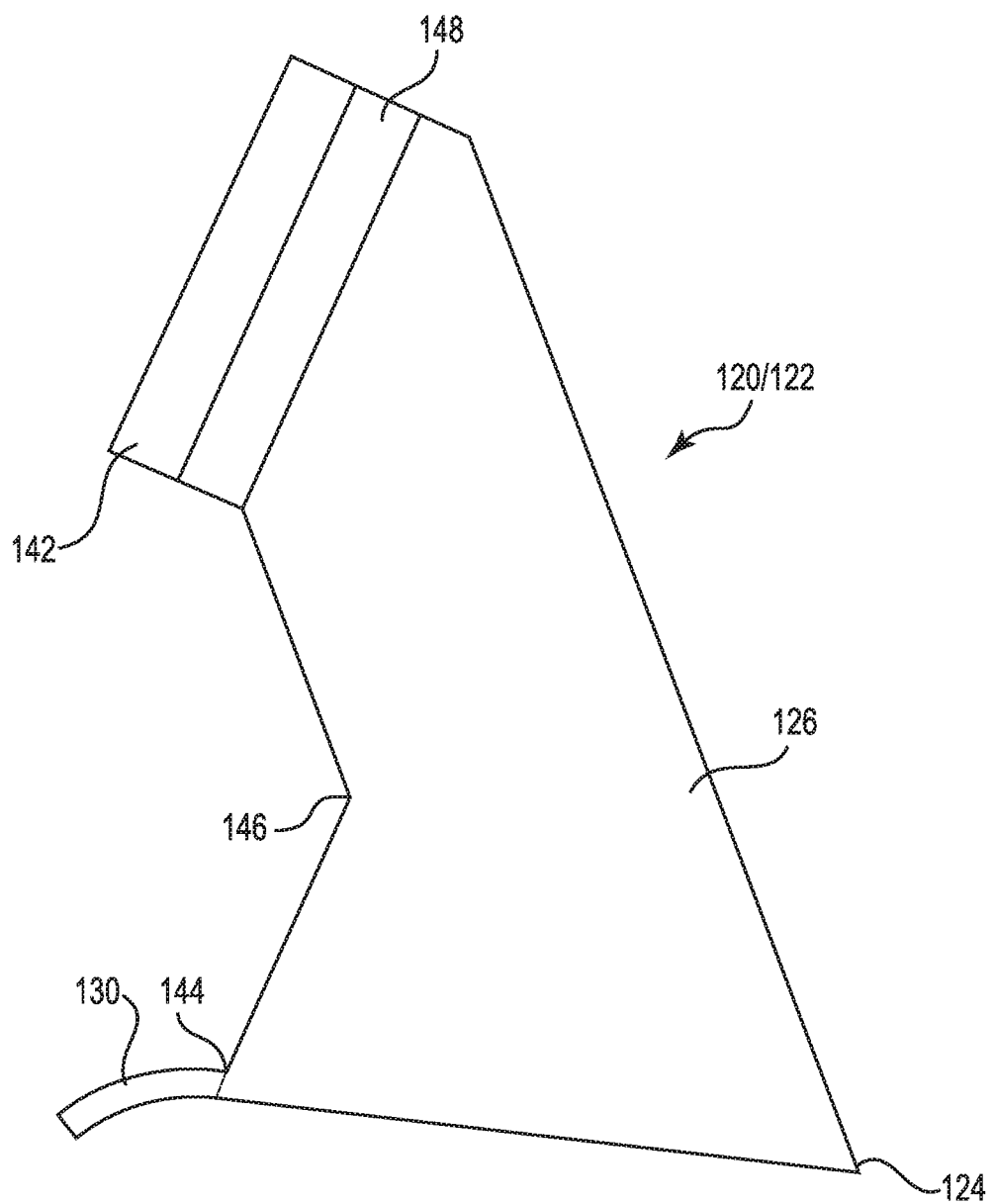

Referring to FIGS. 3A and 3B, the airfoil 108 is operably connected to the tube 110 by placing the curved walls 136 of the brackets 138 for each half 120, 122 around the tube 110. In other words, the tube 110 may be received in the tube recess 148 defined by the curved walls 136. The flange 142 portions of each of the brackets 138 may then be fastened together (e.g., through welding, adhesive, or the like). The brackets 138 may be securely connected to the tube 110 and support the fin 126 and other portions of the airfoil 108 on the tube 110. It should be noted that although the airfoil 108 is illustrated in FIGS. 3A-4 as including two separate components that are attached to the tube 110, in some embodiments, the airfoil 108 may include a single component that connects to the tube 110 or the airfoil may be integrally formed with the tube (e.g., through die cast machining, injection molding, or the like).

Figure 6:
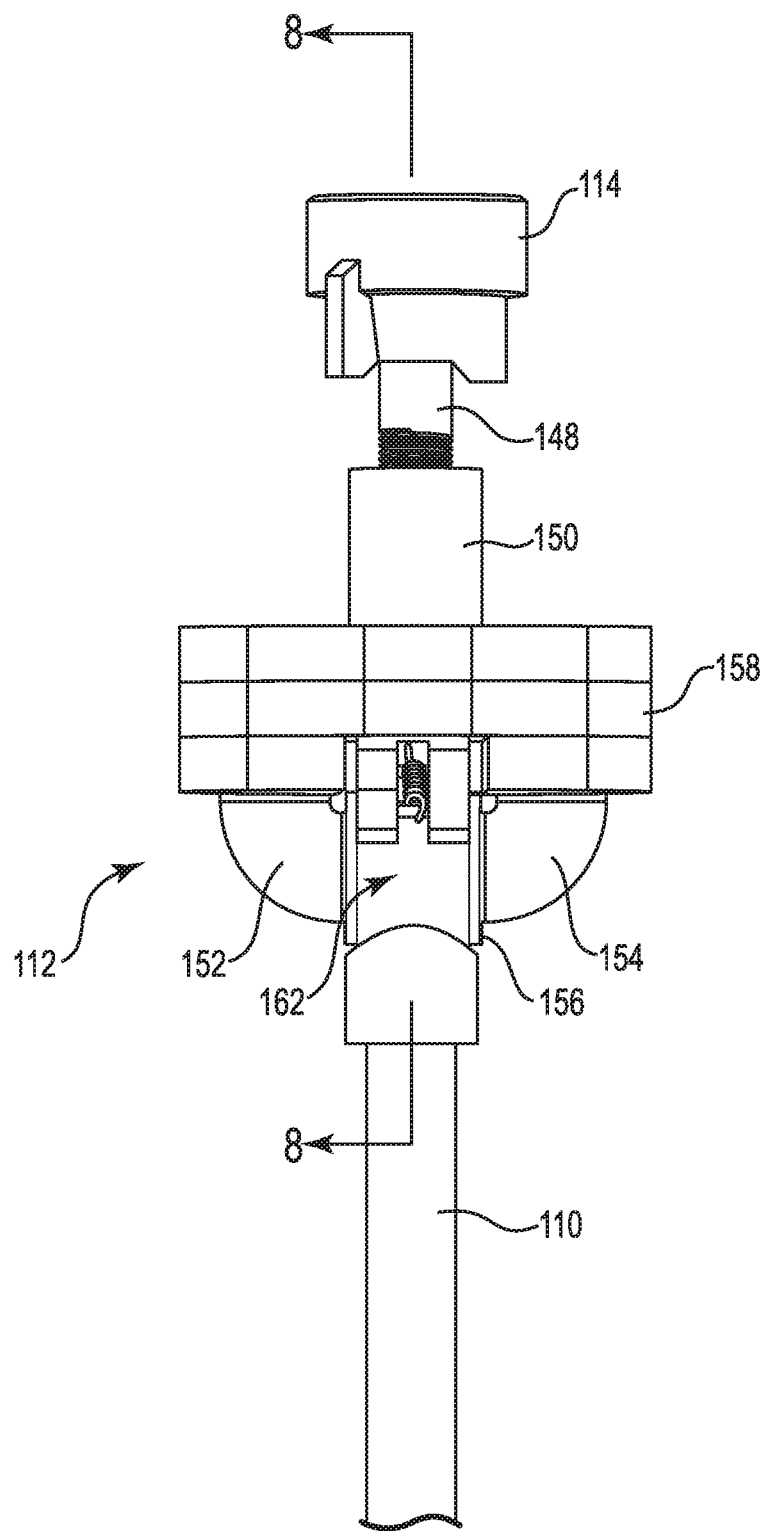
Figure 7:
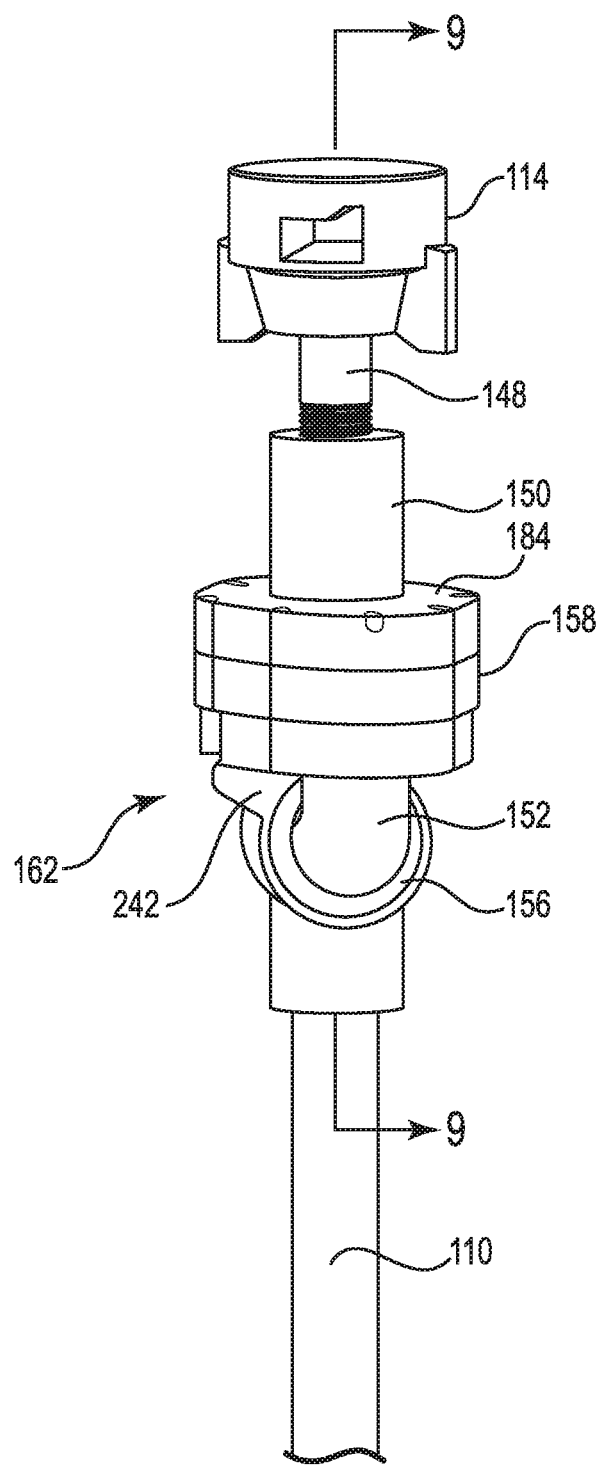
Figure 8:
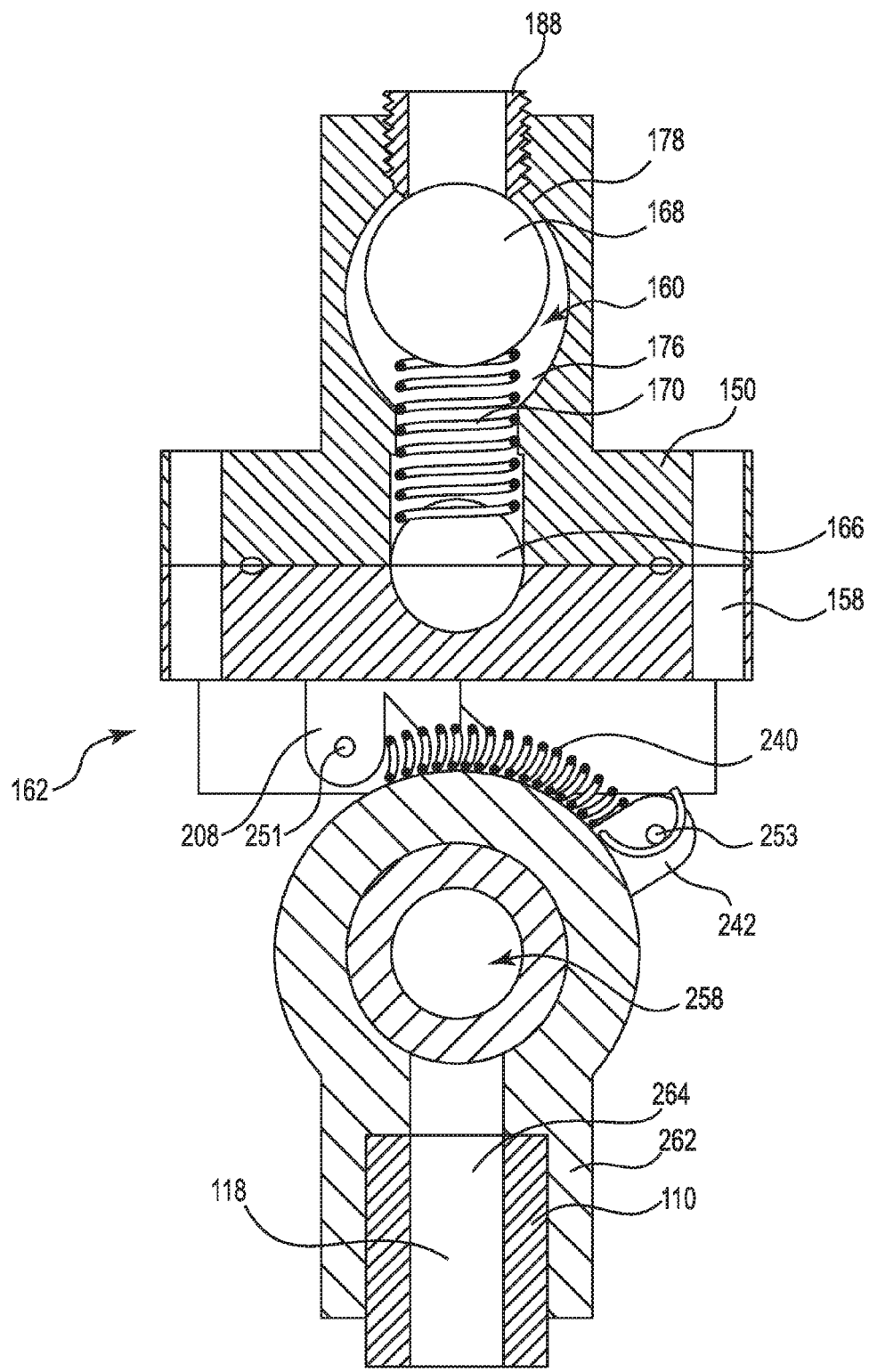
Figure 9:
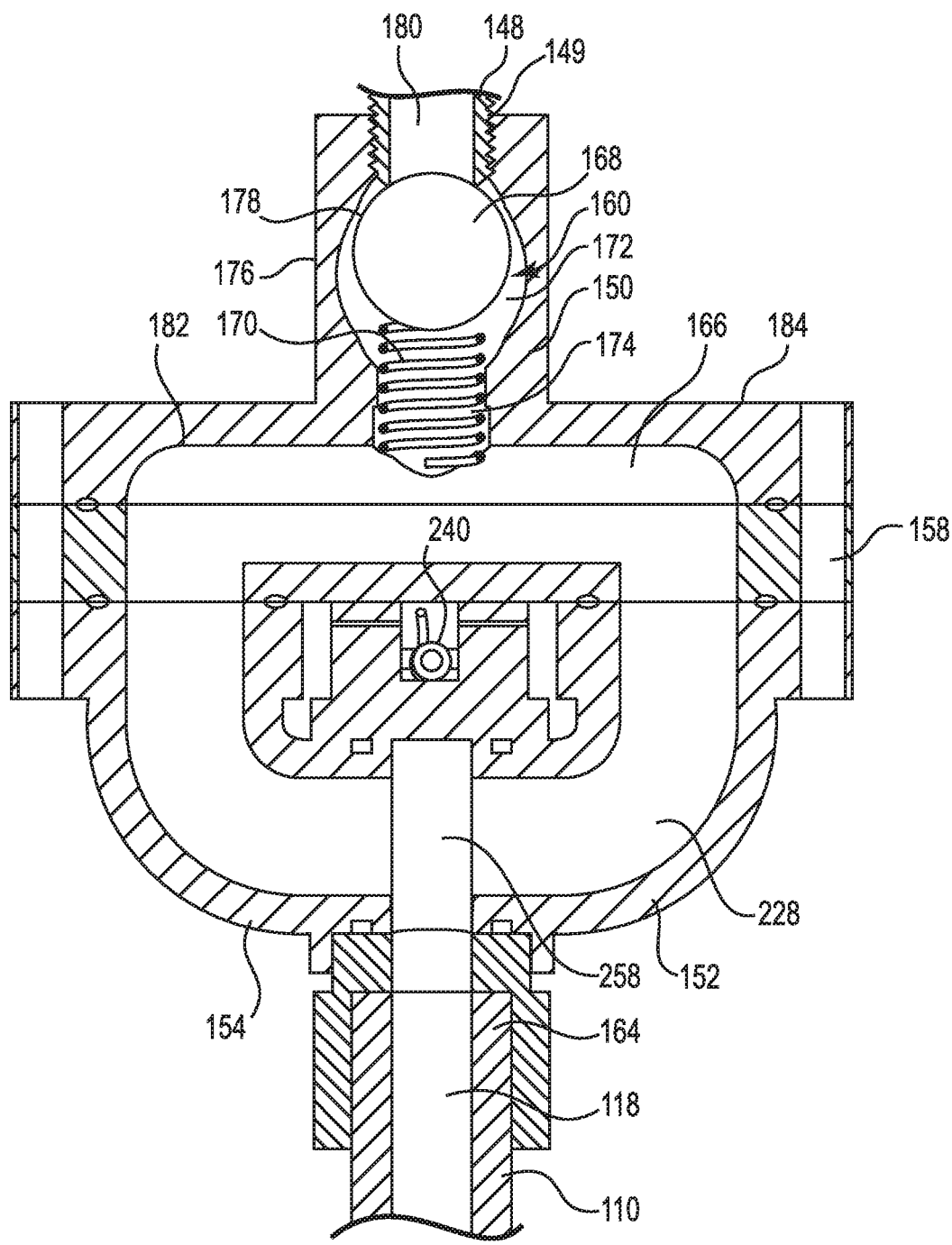

The valve assembly 112 will now be discussed in more detail. FIGS. 6-7 are various enlarged perspective views of the drop nozzle illustrating the valve assembly. FIG. 8 is a cross-section view of the drop nozzle taken along line 8-8 in FIG. 6. FIG. 9 is a cross-section view of the drop nozzle taken along line 9-9 in FIG. 7. The valve assembly 112 is operably connected to a top end of the tube 110 and may connect the tube 110 to the attachment collar 114. For example, a coupling member 149 may be threadingly connected to the valve assembly 112 and the attachment collar 114. The coupling member 149 may define a flow pathway 180 therethrough to fluidly connect the drop nozzle to the reservoir. Additionally, the valve assembly 112 may be received onto a top end 164 or inlet of the tube 110. As will be discussed in more detail below, the valve assembly 112 may actuate a valve to prevent or reduce fluid flow in instances where the spray tip 115 or the tube 110 is broken off of the drop nozzle assembly.

With reference to FIGS. 6 and 7, the valve assembly 112 may include a valve housing 150, a base 158, two arm members 152, 154, and a hinge assembly 162, each of the preceding components will be discussed in detail below. It should be noted that the valve assembly and housing may be implemented in a variety of different manners and the description of any particular embodiment is meant as illustrative only.

Figure 10A:
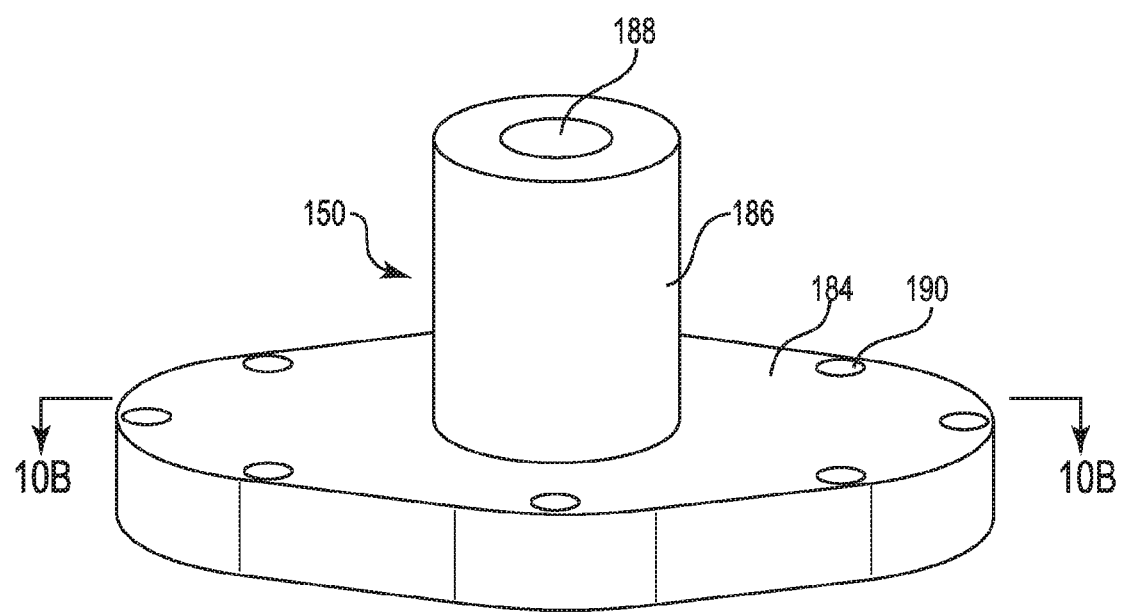
Figure 10B:
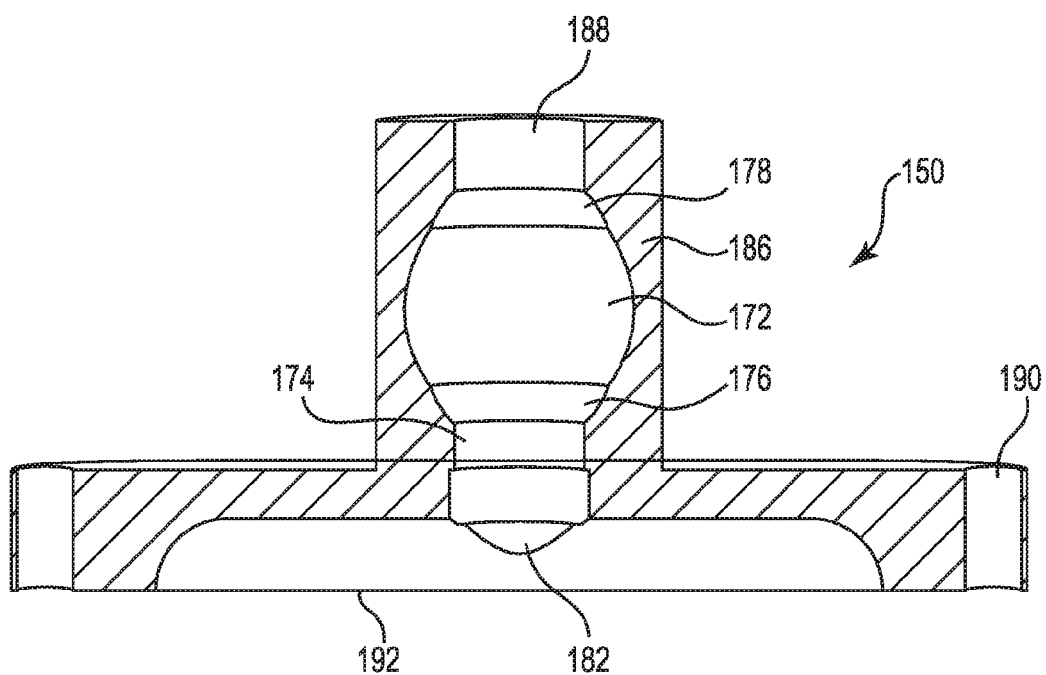

The valve housing 150 houses a shutoff valve 160. The valve housing 150 connects to the coupler 148 and forms a top portion of the valve assembly 112. FIG. 10A is a top elevation view of the valve housing 150. FIG. 10B is a cross-section view of the valve housing taken along line 10B-10B in FIG. 10A. With reference to FIGS. 9-10B, the valve housing 150 may include a valve arm 186 that extends upwards from a roof 184 of the housing 150. The roof 184 defines a plurality of fastening apertures 190. The fastening apertures 190 may receive one or more fasteners (not shown) to connect the valve housing 150 to the base 158 and/or arms 152, 154.

The valve arm 186 is generally cylindrical and defines a receiving aperture 188 that connects to the coupler 148, as well as a ball cavity 172. The valve arm 186 defines a fluid passage therethrough. The fluid passage varies in diameter as it extends through the valve arm 186. With reference to FIGS. 9 and 10B, a seat 176 and a second seat 178 are defined on either end of the ball cavity 172. The seats 176, 178 have a reduced diameter as compared to the ball cavity 172 and form a seating portion for the shutoff valve 160, as will be discussed in more detail below. The valve arm 186 further defines a spring cavity 174 in communication with the ball cavity 172 and a spring groove 182.

An interior of the roof 184 may define a fluid recess 192. The fluid recess 192 is in communication with the cavities and fluid passageways defined in the valve arm 186. The fluid recess 192 interacts with the base 158 to define a fluid passageway, discussed in more detail below.

Figure 11A:
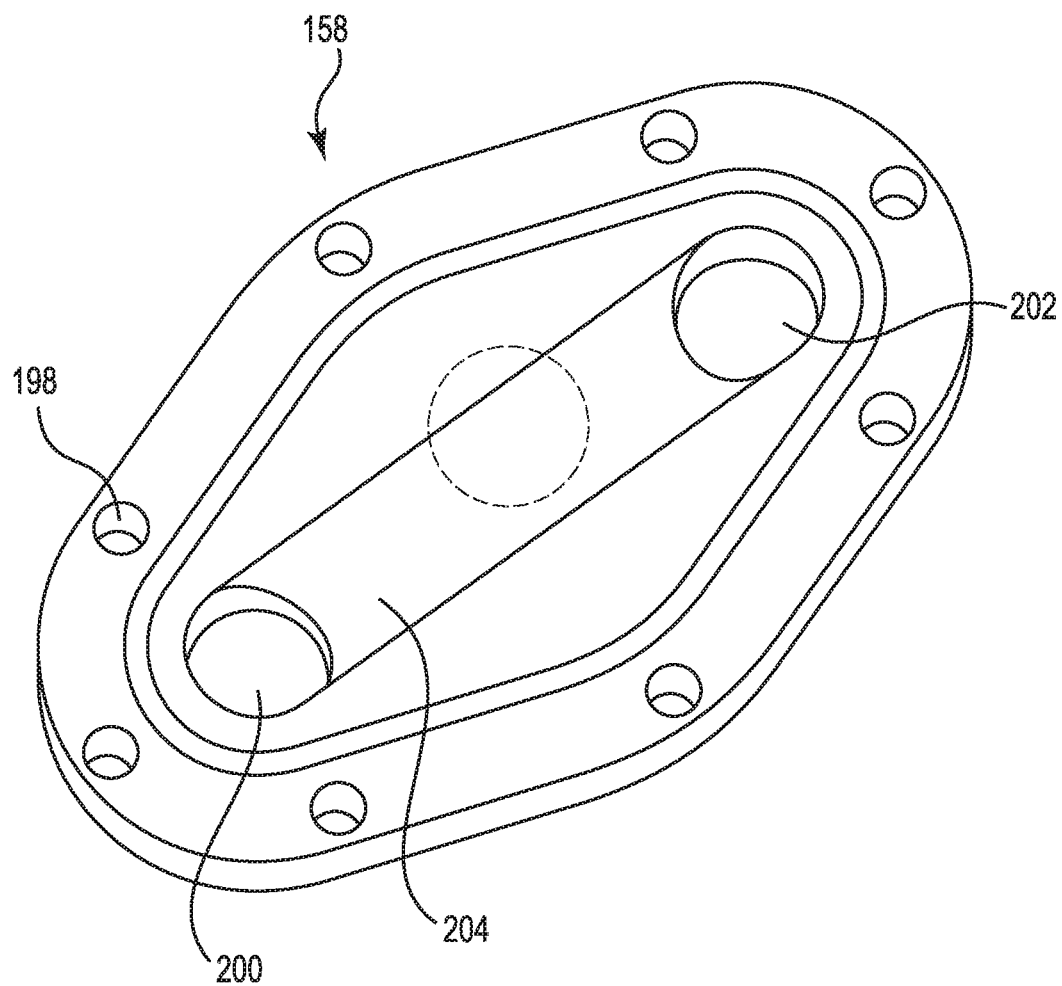
FIG. 11A is a top perspective view of a base of the valve assembly.
Figure 11B:
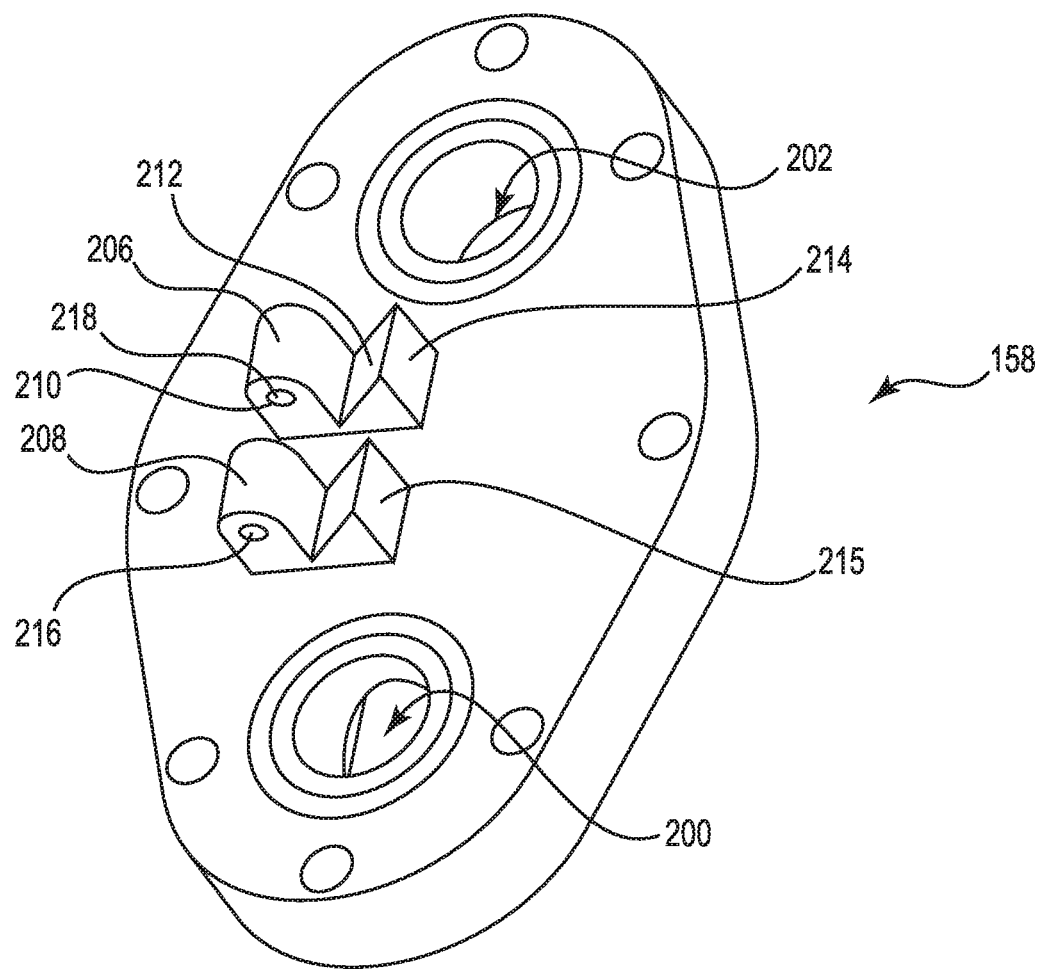
FIG. 11B is a bottom perspective view of the base of FIG. 11A.

The base 158 will now be discussed in more detail. FIG. 11A is a top perspective view of the base 158. FIG. 11B is a bottom perspective view of the base 158. With reference to FIGS. 9, 11A, and 11B, the base 158 connects with the valve housing 150 to form an intermediate portion of the valve assembly 112. The base 158 may generally conform to the shape of the valve housing 150 and may attach to a bottom surface of the housing 150.

The base 158 may include a fluid channel 204, which as shown in FIG. 9, interacts with the fluid recess 192 in the valve housing 150 to define a fluid passageway 166 through the valve assembly 112. Referring to FIGS. 11A and 11B, the base 158 may further define two fluid apertures 200, 202. The fluid apertures 200, 202 may be defined on opposing ends of the fluid recess 192. The first fluid apertures 200 may be in fluid communication with the first arm 152 and the second fluid aperture may be in fluid communication with the second arm 154.

The base 158 may further include a plurality of fastening apertures 198. The fastening apertures 198 may be aligned with the fastening apertures 190 on the valve housing 190, such that a plurality of fasteners may extend through the fastening apertures 190 in the valve housing 150 through the fastening apertures 198 in the base 158.

With reference to FIG. 11B, the base 158 may include two hinge supports 206, 208. The hinge supports 206, 208 extend from a bottom surface of the base 158 and define support structures for the hinge assembly 162, discussed in more detail below. Each of the hinge supports 206, 208 may include a pin support defining pin apertures 216, 218 therethrough and a stop portion 210, 212 including an engagement surface 214, 215. The engagement surface 214, 215 may engage an end surface of a hub, discussed in more detail below. The engagement surface 214, 215 of each of the hinge supports 206, 208 may be a relatively planar surface extending vertically downwards from the bottom of the base 158.

Figure 12:
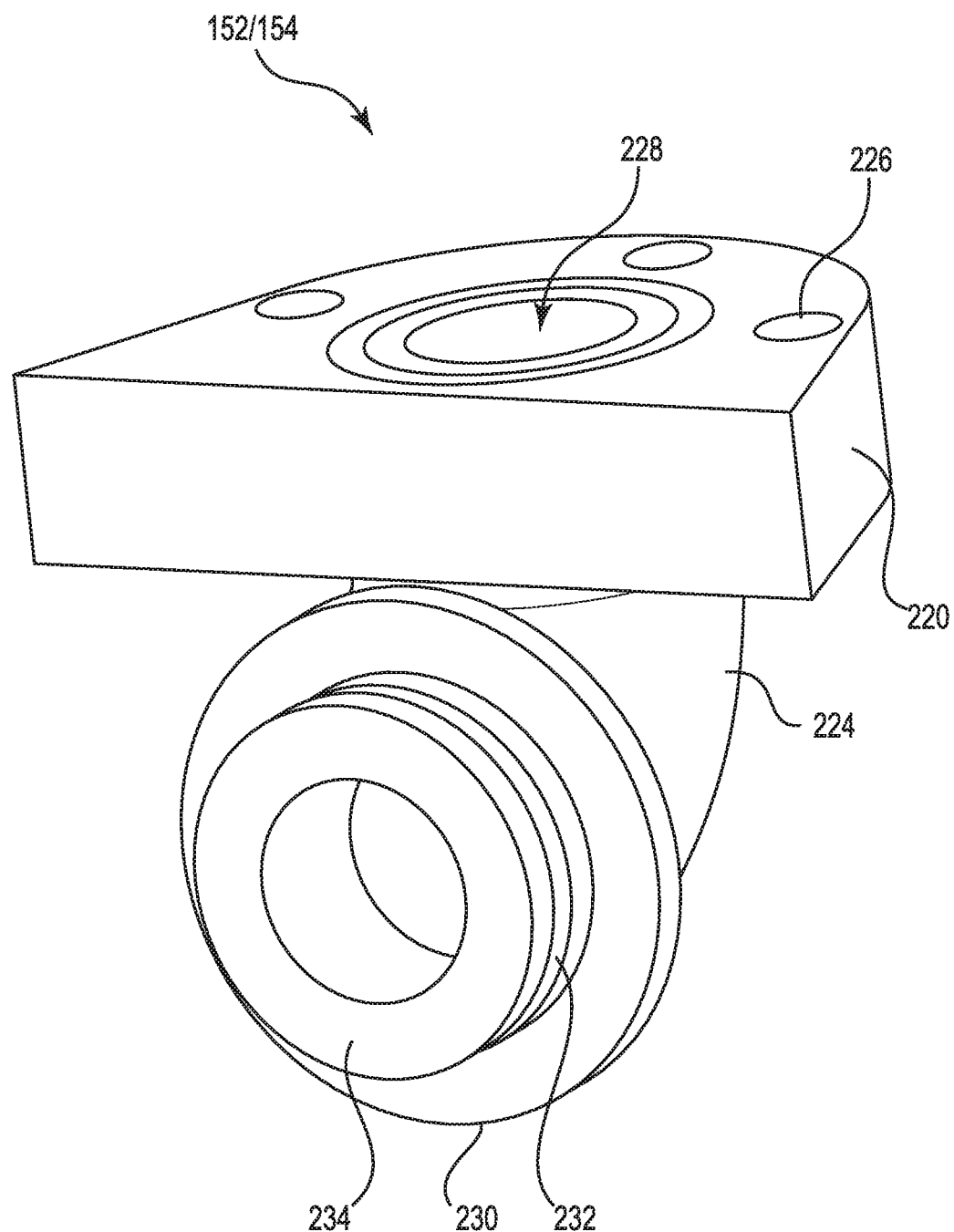
FIG. 12 is a side perspective view of an arm of the valve assembly.

The arms 152, 154 will now be discussed in more detail. FIG. 12 is a perspective view of one arm of the valve assembly. It should be noted that each of the arms 152, 154 may be substantially the same and so the discussion of one arm may be applied to the other arm. With reference to FIGS. 9 and 12, each of the arms 152, 154 may form a fluid flow branch for the valve assembly 112. The arms 152, 154 may have a branch body 224 defining a branch pathway 228 therethrough, the branch pathway 228 being in fluid communication with the pathway 166 defined by the valve housing 150 and the base 158.

A connection flange 220 extends from a top end of the branch body 224. The connection flange 220 defines a plurality of fastening apertures 226 therethrough. A lip 230 extends around a bottom portion of the branch body 224 with a bottom end 234 of the branch body 224 extending past the lip 230. An annular groove 232 is defined around the bottom end 234 and may be configured to receive an O-ring or other sealing member.

Figure 13:
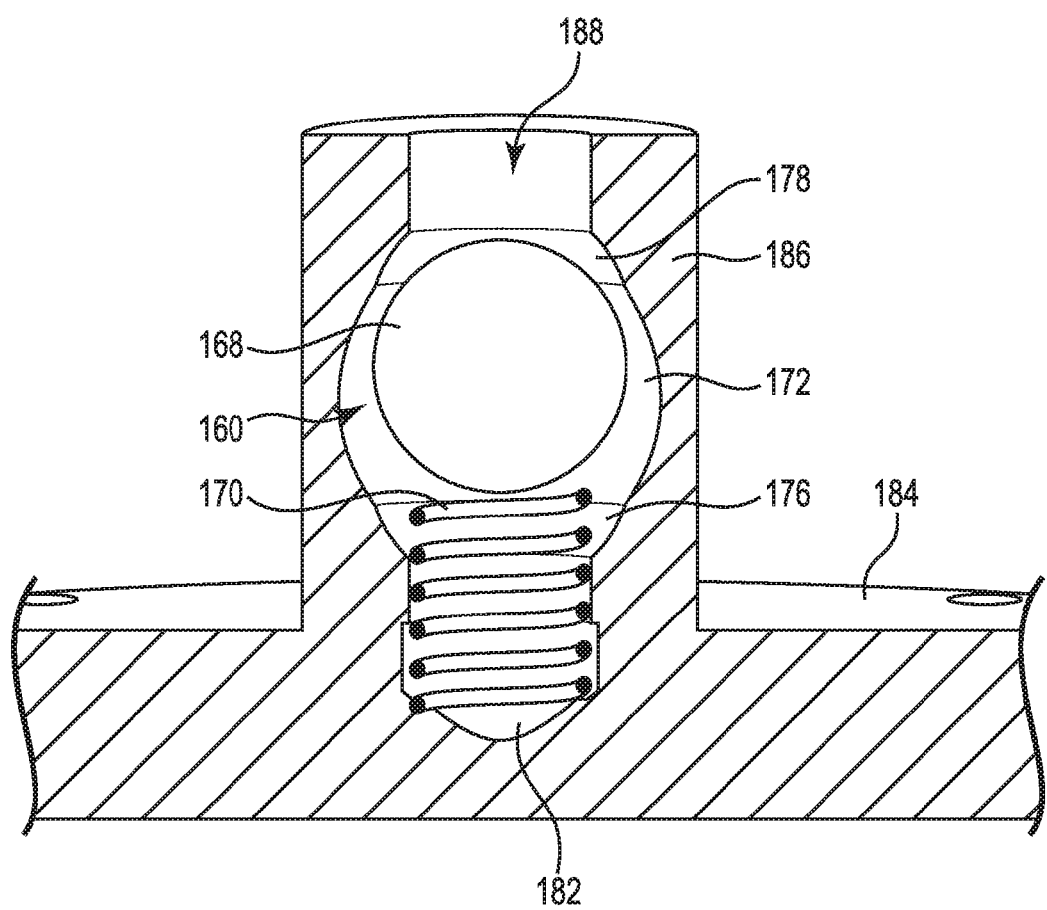
FIG. 13 is an enlarged cross-section view of the valve assembly similar to FIG. 9.

The shutoff valve 160 will now be discussed in more detail. FIG. 13 is an enlarged view of the cross-section of FIG. 9 illustrating the shutoff valve. With reference to FIGS. 9 and 13, the shutoff valve 160 may include a ball 168 or sealing member and a biasing member 170 or spring. The ball 168 may be supported within the ball cavity 172 by the biasing member 170. The biasing member 170, which may be a coil spring, exerts a biasing force against the ball 168 pushing the ball 168 towards the upper seat 178.

The ball 168 has a diameter configured to allow fluid to flow around the ball 168 when the ball 168 is within the ball cavity 172 (i.e., a diameter smaller than a diameter of the ball cavity), but may be sufficiently large to seal against the upper seat 178 and/or the lower seat 176 to prevent fluid into or out of the ball cavity 172. Actuation of the ball will be discussed in more detail below, but generally the ball may be forced by an increased fluid flow or fluid pressure into the lower seat 176, sealing the outlet to the ball cavity.

One or more coils or flexible elements of the biasing member 170 may be received into the spring groove 182 defined in the valve housing 150. The spring groove 182 secures the biasing member 170 to the valve housing 150. The operation of the shutoff valve 160 will be discussed in more detail below. Briefly, the shutoff valve 160 may restrict or prevent flow entering into the drop nozzle 106 by selectively varying fluid flow entering and/or exiting the ball cavity 172.

Figure 14A:
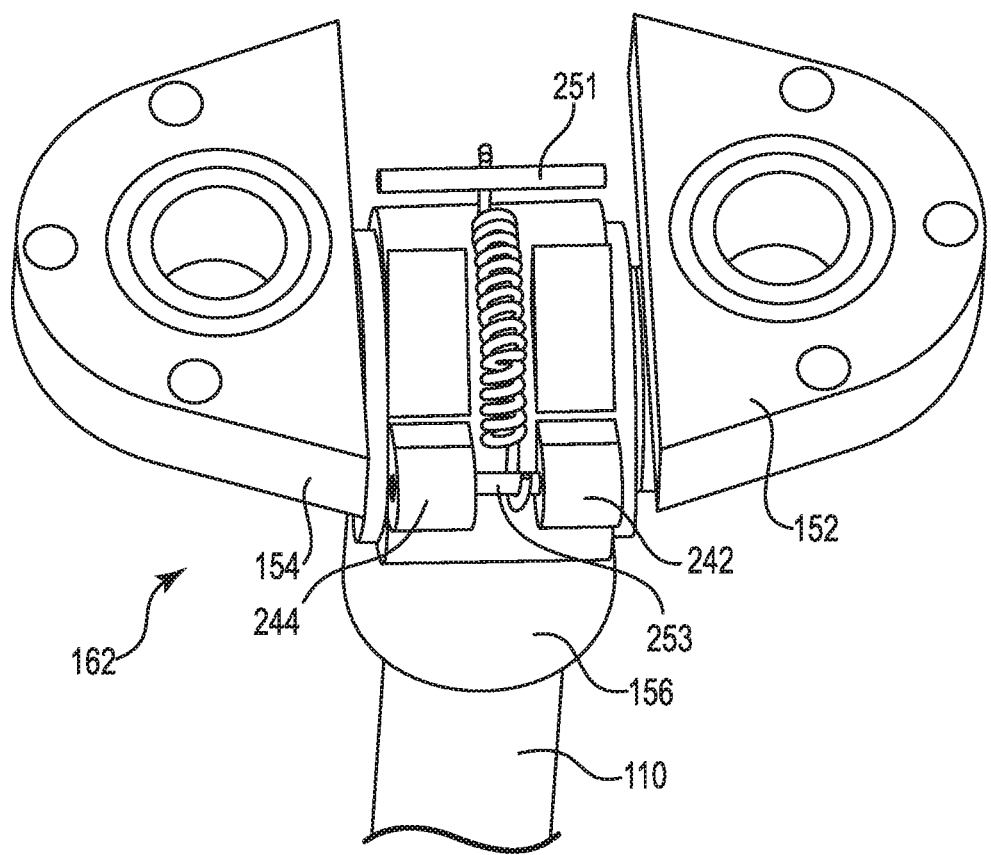
FIG. 14A is a top perspective view of the drop nozzle with select features hidden for clarity to illustrate the hinge assembly.
Figure 14B:
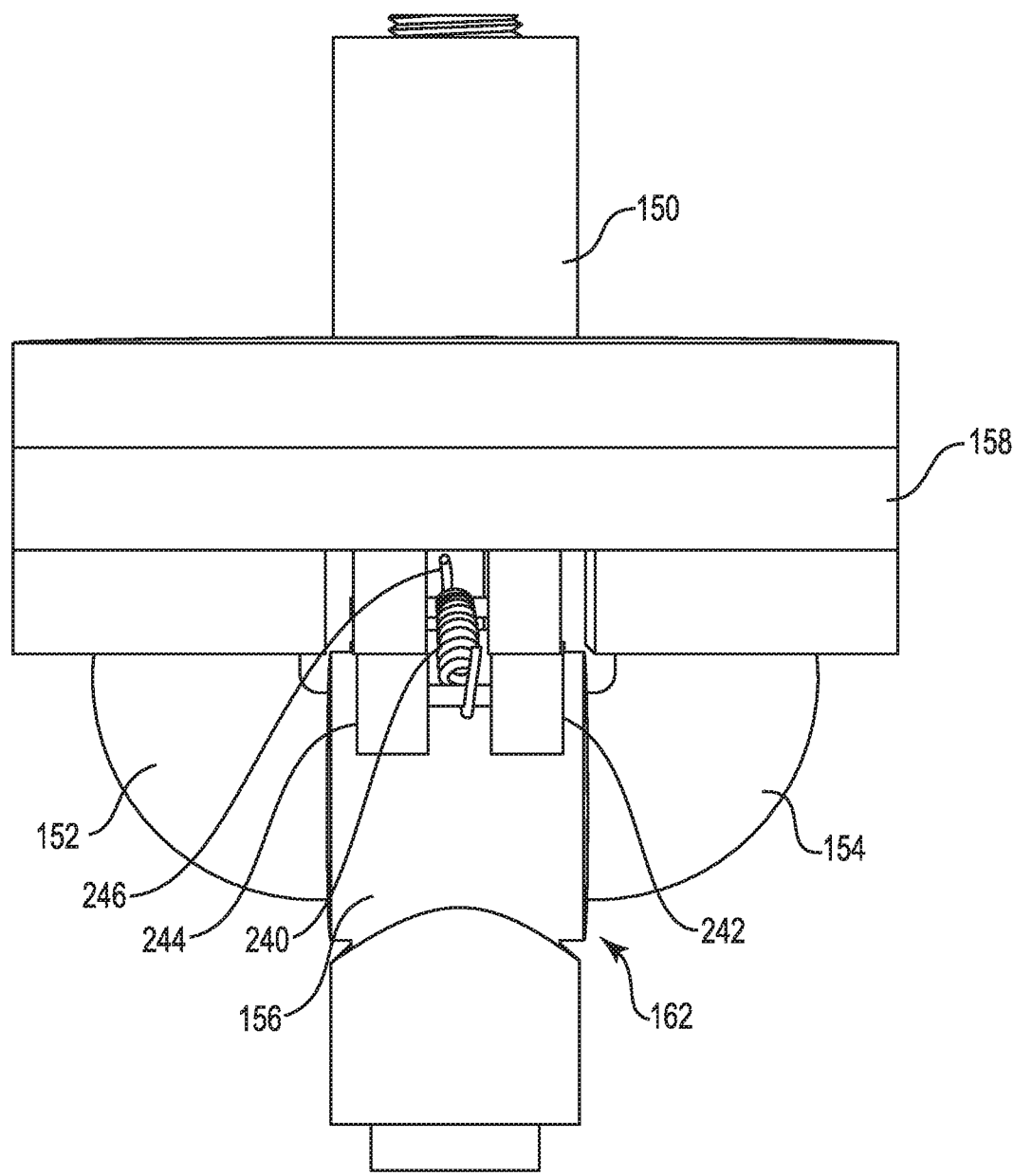
FIG. 14B is an enlarged rear elevation view of the drop nozzle.

The hinge assembly 162 will now be discussed in more detail. FIG. 14A is a top perspective view of the drop nozzle with certain components hidden for clarity. FIG. 14B is an enlarged elevation view of the drop nozzle. With reference to FIGS. 14A and 14B, the hinge assembly 162 allows the tube 110 to rotate relative to the valve housing 150. The hinge assembly 162 may include a hub 156, a return member 240, and retaining pins 251, 253.

The return member 240 may be a spring or other biasing member. In some embodiments, the return member 240 may be a torrid or coil spring. The return member 240 may include hooks 246 on either end. The hooks 246 may be used to secure the return member 240 to the drop nozzle 106 and will be discussed in more detail below.

Figure 15:
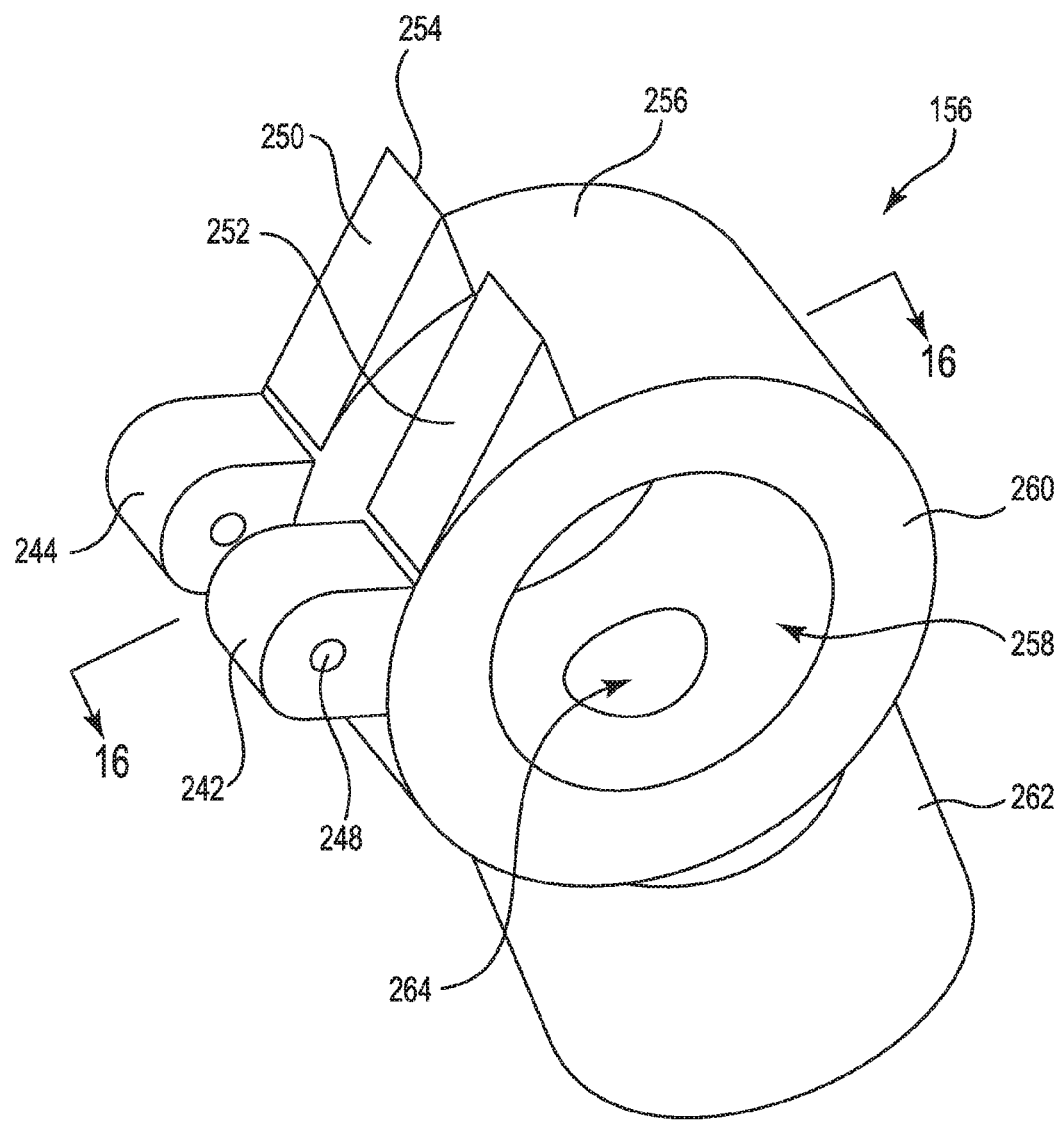
FIG. 15 is a top perspective view of a hub of the valve assembly.
Figure 16:
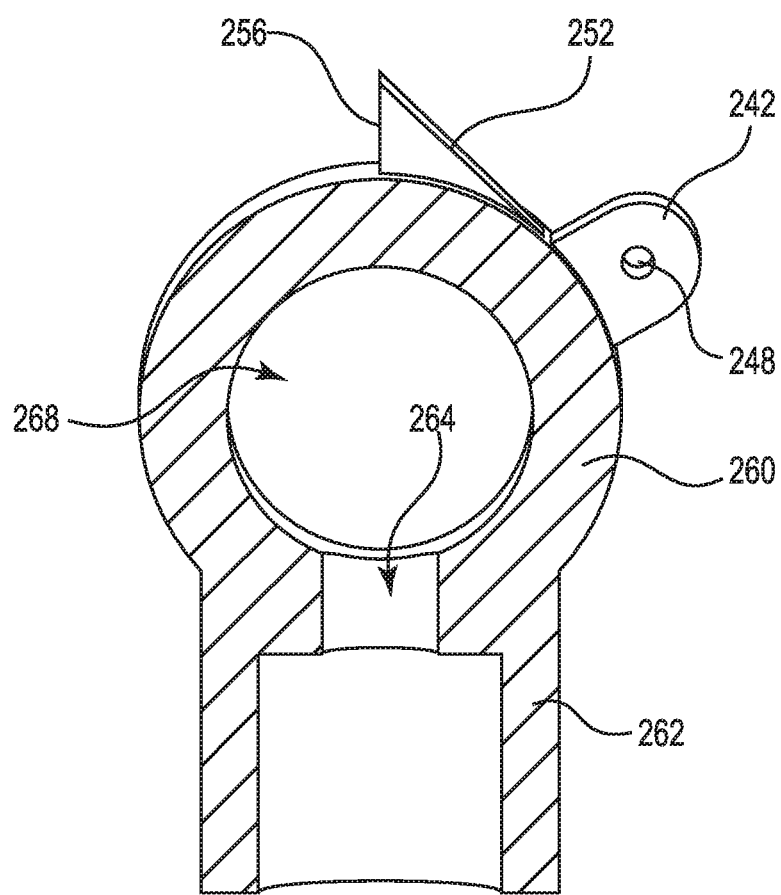
FIG. 16 is a cross-section view of the hub taken along line 16-16 in FIG. 15.

The hub 156 may be rotatably connected to each of the arms 152, 154. FIG. 15 is a top perspective view of the hub. FIG. 16 is a cross-section view of the hub taken along line 16-16 in FIG. 15. With reference to FIGS. 15 and 16, the hub 156 may include a main body 260 and a tube coupler 262 extending vertically from the main body 260. The main body 260 may define a central aperture longitudinally therethrough. The central aperture 258 may be in fluid communication with the arms 152, 154. A hub aperture 264 may be defined through the tube coupler 262 and may be in fluid communication with the central aperture 258. In some embodiments, fluid may flow through the central aperture 258 in a first direction and change directions to flow through the hub aperture 264 in a direction that is substantially perpendicular to the flow direction within the central aperture 258.

The main body 260 may further include two hinge supports 242, 244 extending from a top surface. The hinge supports 242, 244 may be substantially similar to the hinge supports formed on the base 158. For example, each of the hinge supports 242, 244 may include a pin aperture 248 defined therethrough and a stop portion 250, 252. Each of the stop portions 250, 252 may define an engagement surface 254, 256. The engagement surfaces 254, 256 may be configured to engage the corresponding engagement surfaces 214, 215 of the hinge supports of the base 158, as will be discussed in more detail below.

Figure 17:
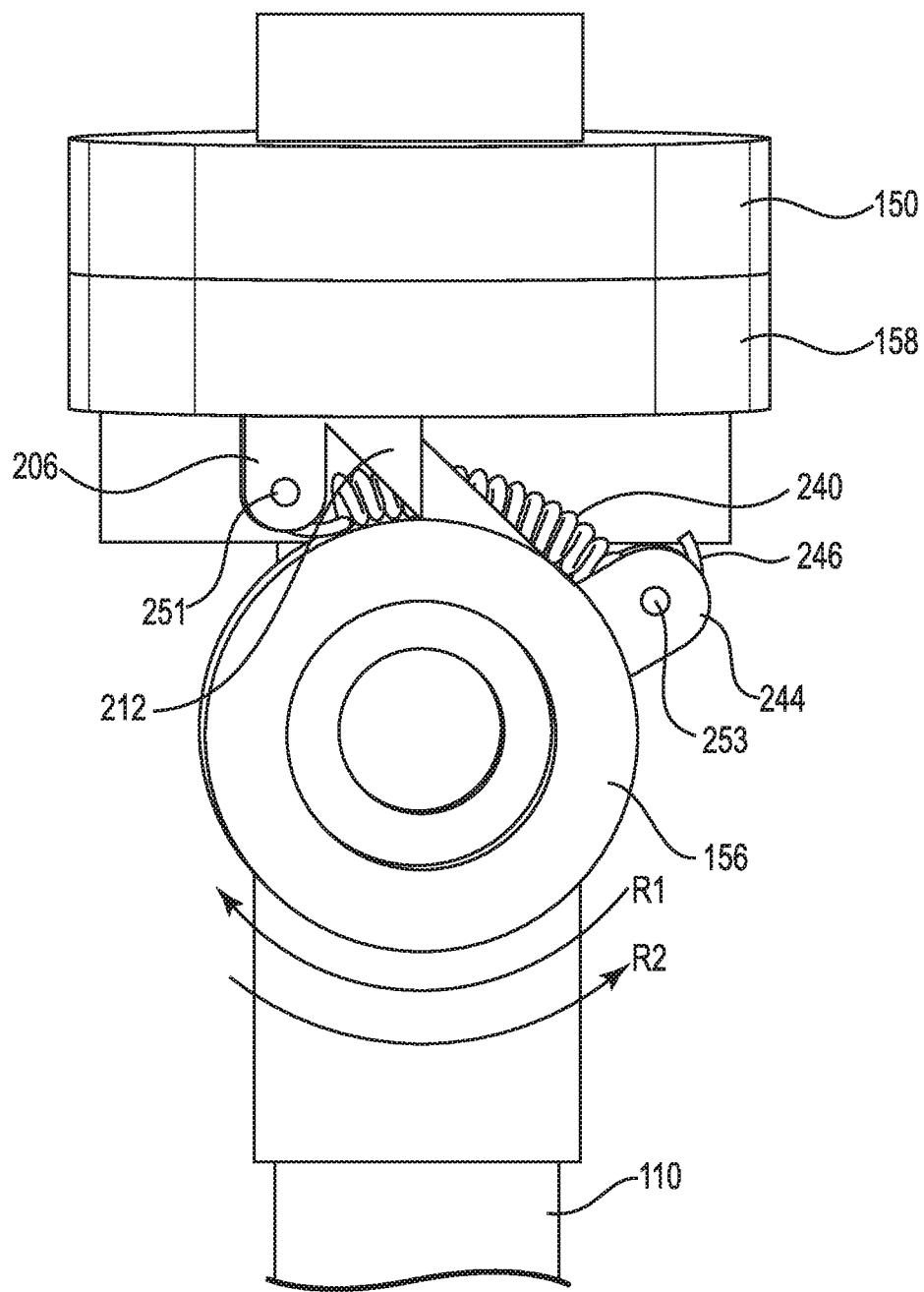
FIG. 17 is a side elevation view of the drop nozzle with select features hidden for clarity to illustrate the hinge assembly.
Figure 18A:
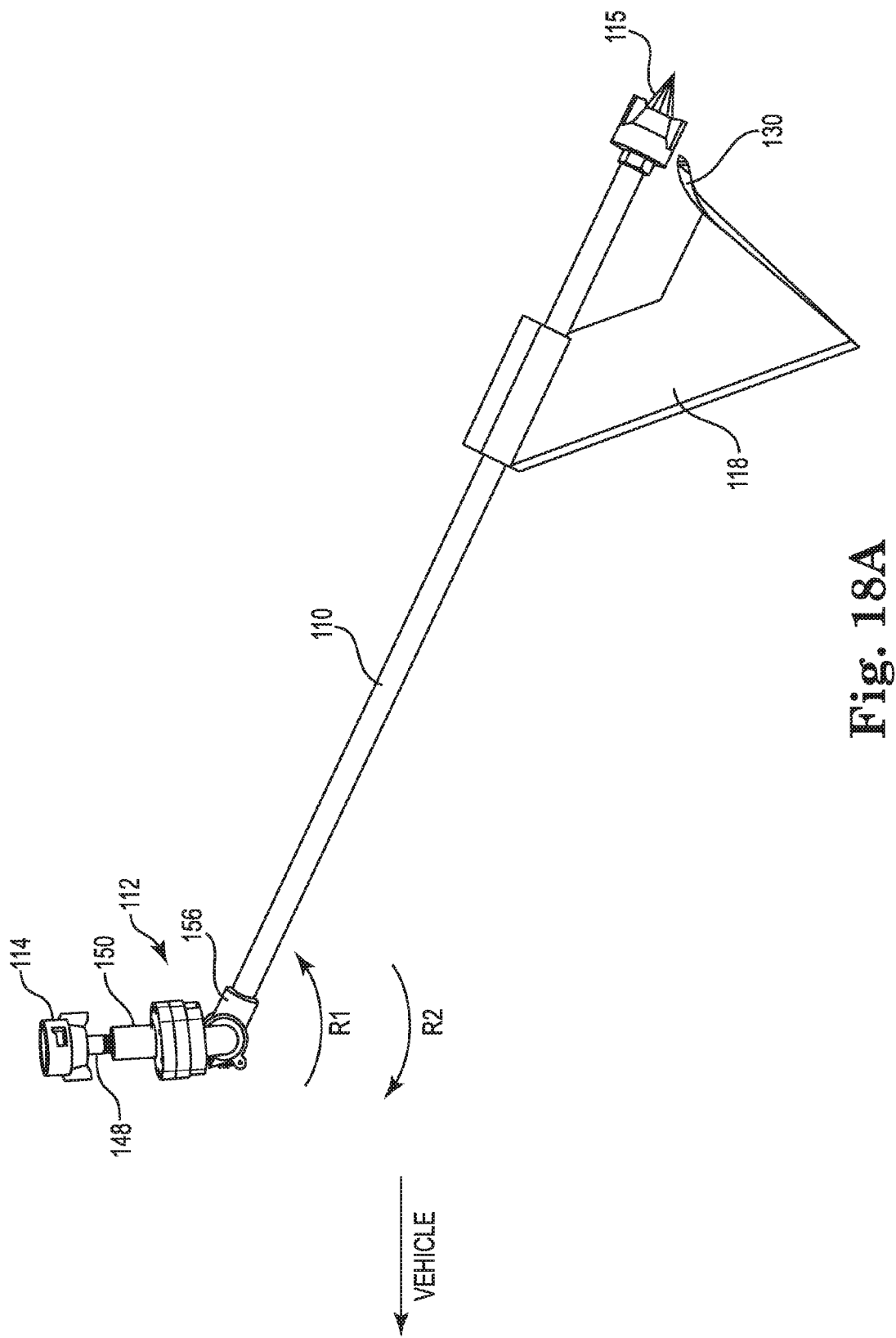
FIG. 18A is a side perspective view of the drop nozzle in a rotated position.
Figure 18B:
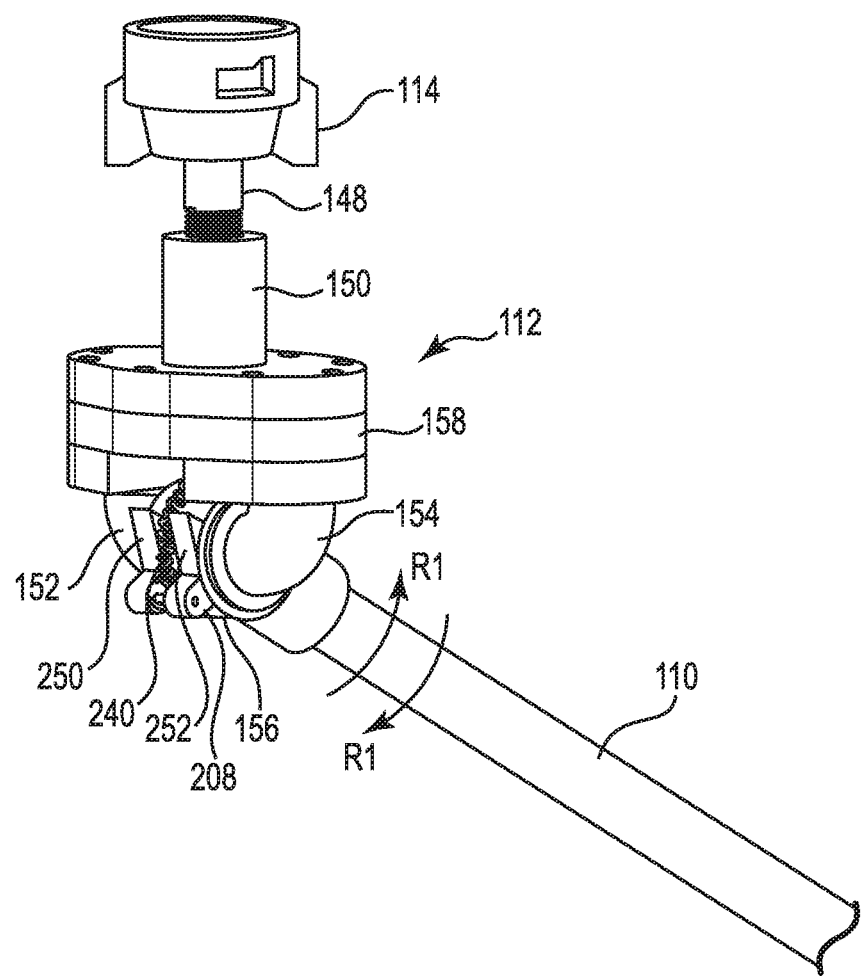
FIG. 18B is an enlarged view of the drop nozzle in FIG. 18A.
Figure 19:
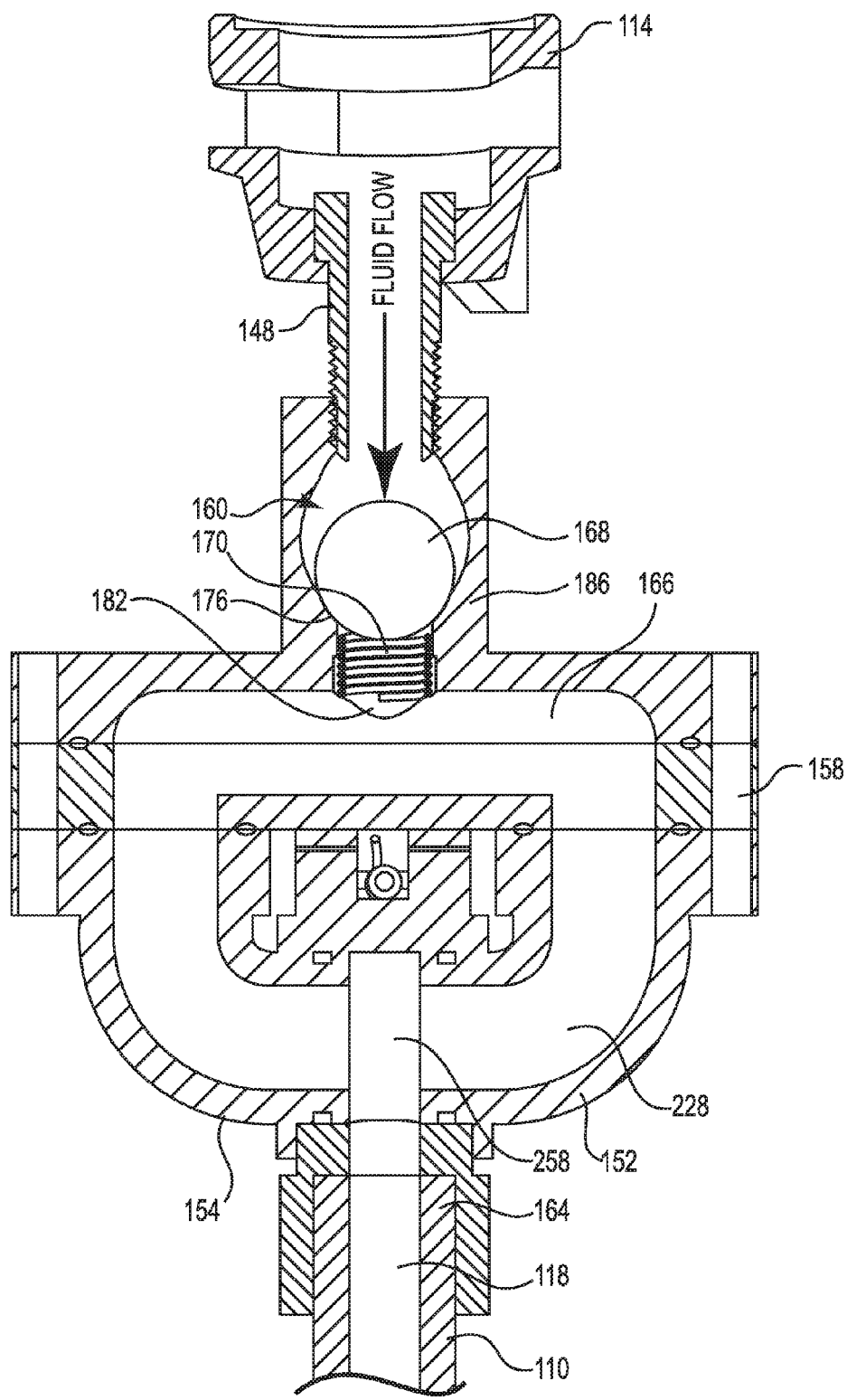
FIG. 19 is a cross-section view similar to FIG. 9, illustrating the valve in a closed position.

FIG. 17 is a side elevation view of the drop nozzle 106 with one of the arms hidden for clarity. With reference to FIGS. 8, 14A, and 17, a first retaining pin 251 may be received into the pin apertures 216 defined on the hinge supports 206, 208 on the base 158 and a second pin 253 may be received through the pin apertures 248 defined through the hinge supports 242, 244 on the hub 156. The hooks 246 of the return member 240 may be received around each of the retaining pins 251, 253 and the return member 240 may extend along the outer surface of the hub 156 between the two sets of hinge supports 206, 208 and 242, 244. In a first position, the engagement surfaces 214, 215, 254, 256 of the respective stops 210, 212, 250, 252, may engage one another along their vertical surfaces. The position of the stops may determine the angle that the hub 156 extends from the base 158 and because the tube 110 is connected to the hub 156, may also determine the angle that the tube 110 extends from the base 158.

Figure 1:
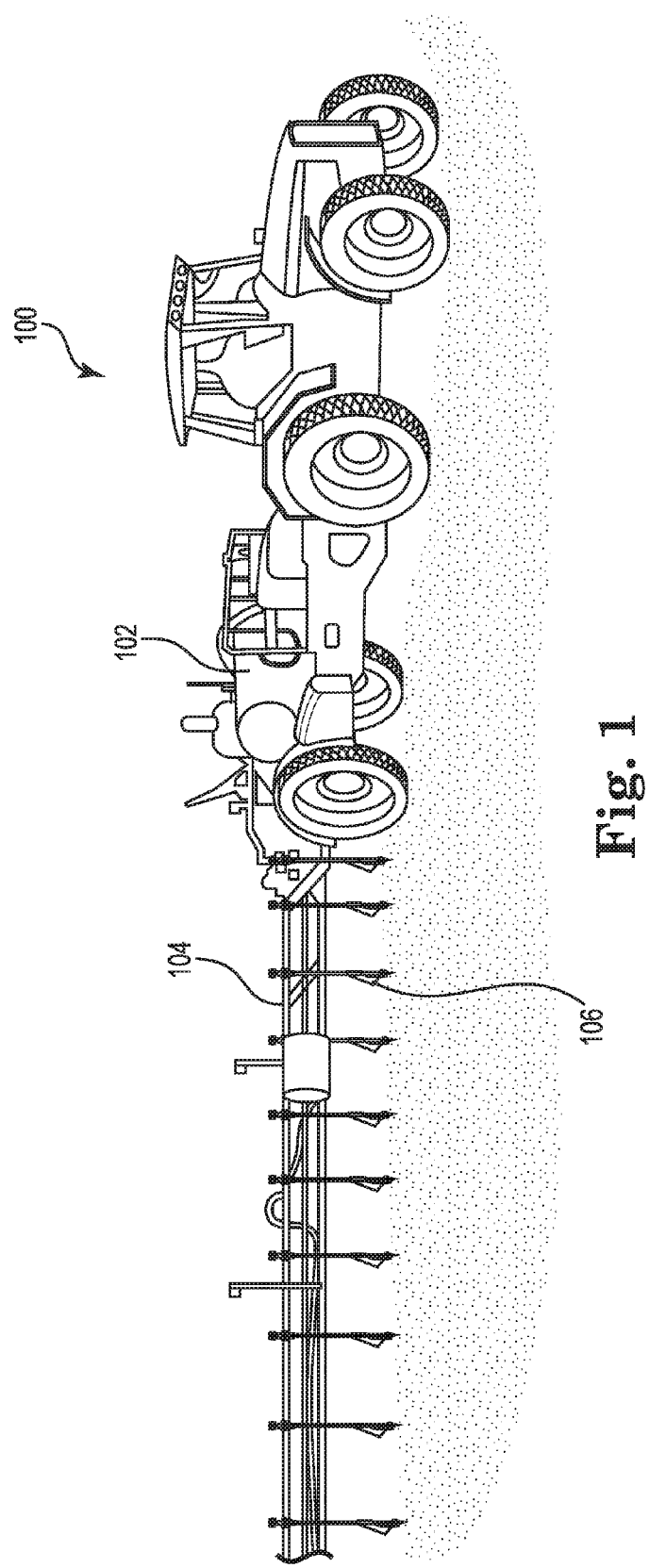

Operation of the drop nozzle 102 will now be discussed in more detail. With reference to FIGS. 1, 2A, and 3A, the attachment collar 114 connects the drop nozzle 106 to the boom 104 and fluidly connects the drop nozzle 106 to the reservoir 102. The sprayer vehicle 100 may begin traveling along a terrain including a plurality of crops, fields, or other plants. The reservoir 102 may include a pump or other distribution mechanism that may then provide fluid (such as insecticide, herbicide, water, or the like) at a predetermined flow rate to the drop nozzle 106. The flow rate may be selected by the pump and also the sprayer tip 115 connected to the drop nozzle. The flow raw may be constant, variable, or otherwise selected by a user. As the vehicle 100 pulls the boom 104 across the terrain, the drop nozzle 106 may experience wind forces due to the movement of the drop nozzle 106 and weather forces. Due to the curved shape of the air guide 130, air may be directed downwards towards the sprayer 115, exerting a force on the spray exiting from the spray tip 115 downwards towards the target area. For example, air may flow over the length of the shield and be directed over the curved air guide 130 downwards (see FIG. 3A).

As the air travels around the airfoil it is directed downward, carrying with it the droplets of the fluid exiting the tube 110 and sprayer tip 115. The air flow directs droplets that in conventional drop nozzles may be carried off-target by irregular air movement, (such as air flow due to the travel of the sprayer vehicle across the field or a crosswind); however, with the airfoil, the drop nozzle of the present disclosure helps to direct the spray toward the target. For example, as described above, the airfoil may create an air wake that prevents turbulent flow at the fluid sheet, allowing the fluid to break into droplets in a substantially quiescent (e.g., airflow dead zone) location.

While the vehicle 100 is pulling the drop nozzle 106 fluid is traveling form the reservoir 102 into the drop nozzle 106. For example, with reference to FIGS. 2A, 8 and 9, fluid may enter into the fluid pathway 180 of the coupling 149 and then may flow around the ball 168 into the ball cavity 172. When the shutoff valve 160 is open, fluid flows into the fluid passageway 166 defined by the base 158 and valve housing 150 and then into each of the passageways 228 defined in the arms 152, 154. From the arms 152, 154, the fluid flows into the central aperture 258 and the hub aperture 264 defined in the hub 156. The fluid then travels through the flow pathway 118 in the tube 110 towards the outlet and the sprayer collar 116. The fluid may then exit the tube 110 through the spray tip 115 onto the terrain or may exit through a nozzle or sprayer.

The hinge assembly 162 operates to allow the drop nozzle 106 to encounter one or more objects, such as hills or changes in topography of the terrain, plants, or the like, without being damaged. In other words, the hinge 162 allows the drop nozzle 106 to deflect when encountering the object, reducing the risk of damage to the drop nozzle 106 or other components of the sprayer 100. With reference to FIGS. 18A and 18B, if the tube 110, the airfoil 108 or other components of the drop nozzle 106 encounter an object as the drop nozzle 106 is pulled by the vehicle 100, the tube 110 may swing upwards (e.g., in rotation direction R1) due to the force. Rather than breaking off of the attachment point to the boom 104, the hub 156 allows the tube 110 to rotate relative to the valve assembly 112 and the coupler 149. This may prevent both the sprayer tip 115 and the tube 110 from breaking off of the valve assembly or the boom.

With reference to FIGS. 17, 18A, and 18B, in some instances, the impact force on the spray tip 115 and/or tube 110 may cause the hub 156 to rotate, causing the return member 240 to expand. Because the hub 156 and the tube 110 are interconnected, the rotation of the hub 156 will also cause the tube 110 to rotate. As the tube 110 and hub 156 rotate, the return member 240 may expand or stretch, allowing the rotational movement.

Once the impact force has been removed, the return member 240 (along with a gravitational force) may act on the tube 110 to return the tube 110 to its original position. In other words, the return member 240 may rotate the hub 156 and the tube 110 in a second rotation direction R2. The return member 240 after being expanded due to the impact force may retract, causing the hub to rotate accordingly.

The stop portions 210, 212, 250, 252 on the hinge supports for the base 158 and the hub 156, respectively, may limit the rotation of the hub 156 in the second rotation direction R2. For example, once the return member 240 has rotated the hub 156 in the second rotation direction R2, the engagement surfaces 214, 215, 254, 256 may engage, preventing further rotation in the second rotation direction R2. In other words, the return member 240 may act to return the hub and the tube to their original orientations after they have been rotated by an impact force.

Activation of the shutoff valve will now be discussed in more detail. FIGS. 9 and 13 illustrate the shutoff valve in the open position. FIG. 19 is a cross-section view of the valve assembly with the shutoff valve in the closed or off position. As briefly described above, the sprayer tip 115 may regulate the fluid flow as it exits the tube 110; however, the line pressure from the reservoir to the valve assembly may be determined by a pump fluidly connected to the reservoir. In instances where either the sprayer tip 115 and/or the tube 110 encounters an object and breaks off, the flow rate exiting the tube 110 may no longer be restricted. In other words, the flow rate restriction typically caused by the sprayer tip 115 (e.g., due to a restricted orifice or aperture) may be eliminated, causing an increase in flow rate from the reservoir into the ball cavity. However, the fluid pressure may remain substantially constant as it may be determined by the pump or other element.

As the flow rate exiting the drop nozzle is no longer restricted, the fluid flow rate through the drop nozzle increases. This flow rate increase exerts a down force on the ball 168, compressing the biasing member 170 and forcing the ball into the lower seat 176. As discussed above, the ball 168 may have a sufficiently large diameter that when seated in the seat 176, may substantially seal the outlet to the ball cavity, thereby sealing the tube 110 or the valve assembly.

The drop nozzle 106 as disclosed herein may provide for lower spray heights and boom heights, even in rough terrain. For example, typically agricultural sprayers may travel at speeds between 10 to 20 mph. On hilly or rough terrain, the height of the boom is typically raised to about 36 to 48 inches above the crop or solid. The raised height may allow the sprayer vehicle to travel faster. However these higher heights have increased spray drift and may not be as effective in spraying the crops.

With the drop nozzle 106, the boom heights may be lowered and the spray height (even over hilly terrain) may be about 18 to 24 inches. The reduced spray height may provide for more accurate fluid distribution, as well as reduced spray drift once the fluid exits the drop nozzle. The lower spray heights are possible, because the drop nozzle 106 may rotate if it encounters an object, preventing it from breaking off. In other words, the flexibly of the drop nozzle allows for the lower spray heights. Additionally, the drop nozzle may include the shutoff valve for instances where it may be broken off. The shutoff valve may prevent spillage of fluid from the reservoir, which may reduce the risk for a broken nozzle and thus allows for lower drop heights. Moreover, the airfoil may further help to direct fluid from the tube towards the target area, further reducing spray drift. In some instances, the drop nozzle may reduce drift potential by two to three times as compared to conventional drop nozzle designs (e.g., a reduction in spray drift of approximately 50% as compared to conventional drop nozzle designs).

Table 1 below illustrates experimental data comparing a conventional nozzle system with the drop nozzle 106. In the experiment for Table 1, the airfoil was omitted and the drop nozzle tested included the hinge assembly and valve assembly, which as described above allows the drop nozzle to be positioned closer to the target area with a reduced risk of breaking or damaging the drop nozzle. As shown in Table 1, the drop nozzle improves drift or off-target movement of a fluid or treatment as compared to conventional nozzle systems.

TABLE 1

| Spray Tip - XR 11002 | | |
|---|---|---|
| Nozzle Type | Treatment | Off-Target Movement |
| Conventional Nozzle | RoundUp PowerMax_Class Act NG | 21.3 feet |
| Drop Nozzle 106 | RoundUp PowerMax_Class Act NG | 6.7 feet |

In Table 1, both the conventional nozzle system and the drop nozzle 106 used the same spray tip, XR 11002 by TEEJET nozzles, which may emit a generally flat spray pattern. Additionally, both the conventional nozzle system and the drop nozzle 106 used the same treatment fluid, in this case RoundUp PowerMax. As shown in Table 1, using the same boom height, the off-target movement for the drop nozzle 106 reduced off-target movement by a factor of 10.

As another example, Table 2 below illustrates experimental data comparing the conventional nozzle system with the drop nozzle 106, using a different spray tip as compared to the data in Table 1. Similarly to the experiment performed in Table 1, the drop nozzle used did not include the airfoil, but included the hinge assembly and the valve assembly.

TABLE 2

| Spray Tip - AIXR 11002 | | |
|---|---|---|
| Nozzle Type | Treatment | Off-Target Movement |
| Conventional Nozzle | RoundUp PowerMax_Class Act NG | 4.7 feet |
| Drop Nozzle 106 | RoundUp PowerMax_Class Act NG | 0.8 feet |

As shown in Table 2, both systems used the same spray time, again by TEEJET, but the spray tip including air induction to further reduce drift. Accordingly, as shown in Table 2, the drift was reduced for both the conventional nozzle system and the drop nozzle 106 as compared to Table 1. However, the drop nozzle 102 again reduced drift significantly as compared to the conventional nozzle system.

It should be noted that Tables 1 and 2 illustrate experimental data and although certain spray tips were used with the drop nozzle 106, other spray tips may be used. Additionally, although a select treatment was used to obtain the results illustrated in Tables 1 and 2, many other fluids may be used with the drop nozzle.

CONCLUSION

Although the present disclosure has been described with a certain degree of particularity, it is understood the disclosure has been made by way of example, and changes in detail or structure may be made without departing from the spirit of the disclosure as defined in the appended claims.

What is claimed is:

1. An airfoil for a fluid delivery tube comprising:

a securing member for operably connecting the airfoil to the tube;

a fin extending downward and outward from the securing member and terminating in a tip;

a shield extending inward and downward from the tip of the fin; and an air guide extending from a first end of the shield.

2. The airfoil of claim 1, wherein the shield defines a bottom surface of the airfoil and has a width larger than a width of the fin.

3. The airfoil of claim 2, wherein the shield defines a substantially triangular shaped platform angled from the tip downward towards the tube.

4. The airfoil of claim 1, wherein the securing member is securable at substantially any location along a length of the tube.

5. The airfoil of claim 1, wherein the securing member comprises a first bracket and a second bracket configured to secure around an outer surface of the tube.

6. The airfoil of claim 1, wherein the airfoil comprises a first shell; and a second shell connected to the first shell.

7. The airfoil of claim 6, wherein the first shell and the second shell are symmetrical.

8. The airfoil of claim 1, wherein the air guide curves downward from the first end of the shield.

9. The airfoil of claim 8, wherein the air guide has an angle of curvature between 0 to 30 degrees relative to the first end of the shield.

* * * * *